US012726627B2

(12) United States Patent
Wang

(10) Patent No.: US 12,726,627 B2
(45) Date of Patent: Sep. 1, 2026

(54) ENHANCED SIGNALLING OF EXTENDED DEPENDENT RANDOM ACCESS SAMPLE POINT SAMPLES IN A MEDIA FILE

(71) Applicant: Bytedance Inc., Los Angeles, CA (US)

(72) Inventor: Ye-Kui Wang, San Diego, CA (US)

(73) Assignee: Bytedance Inc., Los Angeles, CA (US)

( * ) Notice: Subject to any disclaimer, the term of this patent is extended or adjusted under 35 U.S.C. 154(b) by 0 days.

(21) Appl. No.: 19/090,847

(22) Filed: Mar. 26, 2025

(65) Prior Publication Data

US 2025/0227240 A1 Jul. 10, 2025

Related U.S. Application Data

(63) Continuation of application No. PCT/US2023/033598, filed on Sep. 25, 2023.

(60) Provisional application No. 63/410,827, filed on Sep. 28, 2022.

(51) Int. Cl.

| | |
|---|---|
| ***H04N 19/136*** | (2014.01) |
| ***H04N 19/132*** | (2014.01) |
| ***H04N 19/184*** | (2014.01) |
| ***H04N 19/70*** | (2014.01) |

(52) U.S. Cl.

CPC ......... *H04N 19/136* (2014.11); *H04N 19/132* (2014.11); *H04N 19/184* (2014.11); *H04N 19/70* (2014.11)

(58) Field of Classification Search

None

See application file for complete search history.

(56) References Cited

U.S. PATENT DOCUMENTS

| | | | | |
|---|---|---|---|---|
| 12,407,831 | B2 * | 9/2025 | Huang | H04N 19/176 |
| 2018/0199042 | A1 | 7/2018 | Wang | |
| 2020/0099997 | A1 * | 3/2020 | Denoual | H04N 21/23439 |
| 2020/0389676 | A1 | 12/2020 | Denoual | |
| 2021/0250617 | A1 | 8/2021 | Hannuksela | |
| 2021/0344908 | A1 * | 11/2021 | Zhang | H04N 19/159 |
| 2022/0103847 | A1 * | 3/2022 | Wang | H04N 7/01 |
| 2024/0406519 | A1 * | 12/2024 | Denoual | H04N 21/6175 |

FOREIGN PATENT DOCUMENTS

| | | | |
|---|---|---|---|
| CN | 114339245 | A | 4/2022 |
| WO | 2020008106 | A1 | 1/2020 |
| WO | 2023137321 | A2 | 7/2023 |

OTHER PUBLICATIONS

Chinese Notice of Allwance from Chinese Patent Application No. 202380070046.8 dated Dec. 1, 2025, 8 pages.

(Continued)

*Primary Examiner* — Talha M Nawaz

(74) *Attorney, Agent, or Firm* — Conley Rose, P.C.

(57) ABSTRACT

A mechanism for processing media data is disclosed. In one aspect, a method includes determining, during a conversion between the media data and a media data file, whether a track reference of type associated external stream track ('aest') is included in a media track. The method also includes performing the conversion based on the determining. Additionally, when present, a track reference type box with a reference type equal to 'aest' shall contain only a track identifier and shall not contain any track group identifier.

20 Claims, 8 Drawing Sheets

Random Access from EDRAP4

(56) References Cited

OTHER PUBLICATIONS

"Series H: Audiovisual and Multimedia Systems Infrastructure of audiovisual services—Coding of moving video High efficiency video coding," Rec. ITU-T H.265 | ISO/IEC 23008-2 (in force edition), Apr. 2013, 317 pages.
"Series H: Audiovisual and Multimedia Systems Infrastructure of audiovisual services—Coding of moving video Versatile video coding," Recommendation ITU-T H.266 dated Aug. 2020, 516 pages.
Rec. ITU-T Rec. H.274 | ISO/IEC 23002-7, "Series H: Audiovisual and Multimedia Systems Infrastructure of audiovisual services Coding of moving video Versatile supplemental enhancement information messages for coded video bitstreams," Aug. 2020, 86 pages.
ISO/IEC 14496-12: "Information technology—Coding of audio-visual objects—Part 12: ISO base media file format," Sixth edition Dec. 2020, 15 pages.
ISO/IEC 23009-1: "Information technology—Dynamic adaptive streaming over HTTP (DASH)—Part 1: Media presentation description and segment formats," ISO/IEC JTC 1/SC Jan. 5, 29, 2012, ISO/IEC 23009-1:2012(E) ISO/IEC JTC 1/SC 29/WG 11, 133 pages.
ISO/IEC 14496-15: "Information technology—Coding of audio-visual objects—Part 15: Carriage of network abstraction layer (NAL) unit structured video in the ISO base media file format, Amendment 2: Carriage of VVC in Isobmff," Draft Amendment ISO/IEC 14496-15:2019 DAM 2, 15 pages.
ISO/IEC 23008-12: "Information technology—High efficiency coding and media delivery in heterogeneous environments—Part 12: Image File Format," Amendment 1: Support for predictive image coding, bursts, bracketing and other inprovements, First edition Dec. 2017, Amendment 1, Nov. 2020, 12 pages.
ISO/IEC JTC 1/SC 29/WG 03 output document N0630, "WD of ISO/IEC 23009-1 5th edition AMD 2 EDRAP streaming and other extensions", Jul. 22, 2022, 16 pages.
International Search Report from PCT Application No. PCT/US2023/033598 dated Sep. 25, 2023, 8 pages.

* cited by examiner

4100

4102

Processor

4104

Memory

Video Processing Circuitry

4106

4200

4202 Determine a track contains a track identifier, which is a first entry in a TrackReferenceTypeBox with reference_type equal to 'aest'.

4204 Perform a conversion between a media data and a media data file based on the track identifier.

ENHANCED SIGNALLING OF EXTENDED DEPENDENT RANDOM ACCESS SAMPLE POINT SAMPLES IN A MEDIA FILE

CROSS-REFERENCE TO RELATED APPLICATIONS

This is a continuation of International Patent Application No. PCT/US2023/033598, filed on Sep. 25, 2023, which claims the benefit of U.S. Provisional Patent Application No. 63/410,827, filed Sep. 28, 2022, both of which are hereby incorporated by reference in their entireties.

TECHNICAL FIELD

The present disclosure relates to generation, storage, and consumption of digital audio video media information in a file format.

BACKGROUND

Digital video accounts for the largest bandwidth used on the Internet and other digital communication networks. As the number of connected user devices capable of receiving and displaying video increases, the bandwidth demand for digital video usage is likely to continue to grow.

SUMMARY

A first aspect relates to a method for processing media data, comprising: determining that a track identifier (ID) identifying a reference track of the media data is included in a track reference type box (TrackReferenceTypeBox) with a reference type (reference_type) equal to associated external stream track ('aest'); and performing a conversion between the media data and a media data file based on the track identifier.

Optionally, in any of the preceding aspects, another implementation of the aspect provides that the track ID is a first entry in the TrackReferenceTypeBox with the reference_type equal to 'aest'.

Optionally, in any of the preceding aspects, another implementation of the aspect provides that when present the TrackReferenceTypeBox with the reference_type equal to 'aest' contains only the track identifier and not any track group identifier.

Optionally, in any of the preceding aspects, another implementation of the aspect provides that when present the TrackReferenceTypeBox with the reference_type equal to 'aest' contains the track identifier in the first entry and contains group track identifiers, if any, in subsequent entries.

Optionally, in any of the preceding aspects, another implementation of the aspect provides that the first entry in the TrackReferenceTypeBox with the reference_type equal to 'aest' shall be the track identifier.

Optionally, in any of the preceding aspects, another implementation of the aspect provides that the media data file specifies whether a closest preceding stream access point (SAP) sample of type 1, 2, or 3 is needed for random accessing from an extended dependent random access point (EDRAP) sample.

Optionally, in any of the preceding aspects, another implementation of the aspect provides that the EDRAP sample is a sample for which all subsequent samples in both decoding and output order can be correctly decoded provided that required preceding SAP or EDRAP samples are available for decoding the sample and subsequent samples, and wherein the required preceding SAP or EDRAP samples include one or more of a set of samples starting from a closest preceding SAP sample of type 1, 2, or 3 in decoding order (closestSapSample), and include all EDRAP samples between closestSapSample and the sample in decoding order.

Optionally, in any of the preceding aspects, another implementation of the aspect provides that an EDRAP sample is a sample for which all subsequent samples in both decoding and output order can be correctly decoded provided that required preceding SAP or EDRAP samples are available for decoding the sample and subsequent samples, wherein the required preceding SAP or EDRAP samples include zero or more of a set of samples starting from a closest preceding SAP sample of type 1, 2, or 3 in decoding order (closestSapSample), and include all EDRAP samples between closestSapSample and the sample in decoding order.

Optionally, in any of the preceding aspects, another implementation of the aspect provides that when the media track has the reference_type of 'aest', for each EDRAP sample sampleA in the media track, there shall be one and only one sample sampleB in a referenced track that has a same decoding time as sampleA, and wherein sampleB shall contain all media data of closest SAP sample of type 1, 2, or 3 that precedes sampleA in decoding order and required preceding SAP or EDRAP samples of sampleA.

Optionally, in any of the preceding aspects, another implementation of the aspect provides that for any EDRAP sample sampleA that is mapped to an EDRAP sample group, a sample sequence (sampleSeq) is a sequence of samples comprising samples including SAP or EDRAP samples identified by ref_sap_or_edrap_idx_delta[i] for i in a range of 0 to num_ref_sap_or_edrap_samples_minus1, inclusive, in decoding order, sampleA, and all samples following sampleA in both decoding and output order in the track.

Optionally, in any of the preceding aspects, another implementation of the aspect provides that for each sample sampleB in sampleSeq, all data needed for processing sampleB shall be accessible in a referenced sample entry, in sampleB, or in any sample that precedes sampleB in decoding order and is present in sampleSeq.

Optionally, in any of the preceding aspects, another implementation of the aspect provides that VisualEdrapEntry( ) is specified as follows:

```
class VisualEdrapEntry( ) extends VisualSampleGroupEntry('edrp') {
  unsigned int(3) edrap_type;
  unsigned int(3) num_ref_sap_or_edrap_samples_minus1;
  unsigned int(2) reserved = 0;
  for(i=0; i <= num_ref_sap_or_edrap_samples_minus1; i++)
    unsigned int(16) ref_sap_or_edrap_idx_delta[i];
}.
```

Optionally, in any of the preceding aspects, another implementation of the aspect provides that num_ref_sap_or_edrap_samples_minus1 plus 1 indicates a number of samples in required preceding SAP or EDRAP samples, which are earlier in decoding order than the EDRAP sample and are needed for reference to be able to correctly decode the EDRAP sample and all samples following the EDRAP sample in both decoding and output order when starting decoding from the EDRAP sample.

Optionally, in any of the preceding aspects, another implementation of the aspect provides that ref_sap_or_edrap_idx_delta[i] indicates an i-th required preceding SAP or EDRAP sample of a current EDRAP sample, wherein a list of SAP or EDRAP samples associated with a SAP sample of type 1, 2 or 3 include a SAP sample and all EDRAP samples following the SAP sample and preceding a next SAP sample, wherein a SAP_or_EDRAP sample index is an index to the list of SAP or EDRAP samples, wherein a value of ref_sap_or_edrap_idx_delta[i] is equal to a difference between a SAP_or_EDRAP sample index of the current EDRAP sample and a SAP_or_EDRAP sample index of an i-th required preceding SAP or EDRAP sample, wherein a value of 1 indicates that an i-th required SAP or EDRAP sample is a last SAP or EDRAP sample preceding the EDRAP sample in decoding order, and wherein a value 2 indicates that the i-th required SAP or EDRAP sample is a second last EDRAP sample preceding the EDRAP sample in decoding order.

Optionally, in any of the preceding aspects, another implementation of the aspect provides that the conversion includes encoding the media data into a bitstream.

Optionally, in any of the preceding aspects, another implementation of the aspect provides that the conversion includes decoding the media data from a bitstream.

A second aspect relates to an apparatus for processing media data comprising: a processor; and a non-transitory memory with instructions thereon, wherein the instructions upon execution by the processor, cause the processor to perform any of the disclosed methods.

A third aspect relates to a non-transitory computer readable medium, comprising a computer program product for use by a video coding device, the computer program product comprising computer executable instructions stored on the non-transitory computer readable medium such that when executed by a processor cause the video coding device to perform any of the disclosed methods.

A fourth aspect relates to a non-transitory computer-readable recording medium storing a bitstream of a video which is generated by a method performed by a video processing apparatus, wherein the method comprises any of the disclosed methods.

A fifth aspect relates to a method for storing bitstream of a video comprising any of the disclosed methods.

A sixth aspect relates to a method, apparatus, or system described in the present disclosure.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRA WINGS

For a more complete understanding of this disclosure, reference is now made to the following brief description, taken in connection with the accompanying drawings and detailed description, wherein like reference numerals represent like parts.

DETAILED DESCRIPTION

Figure 1:
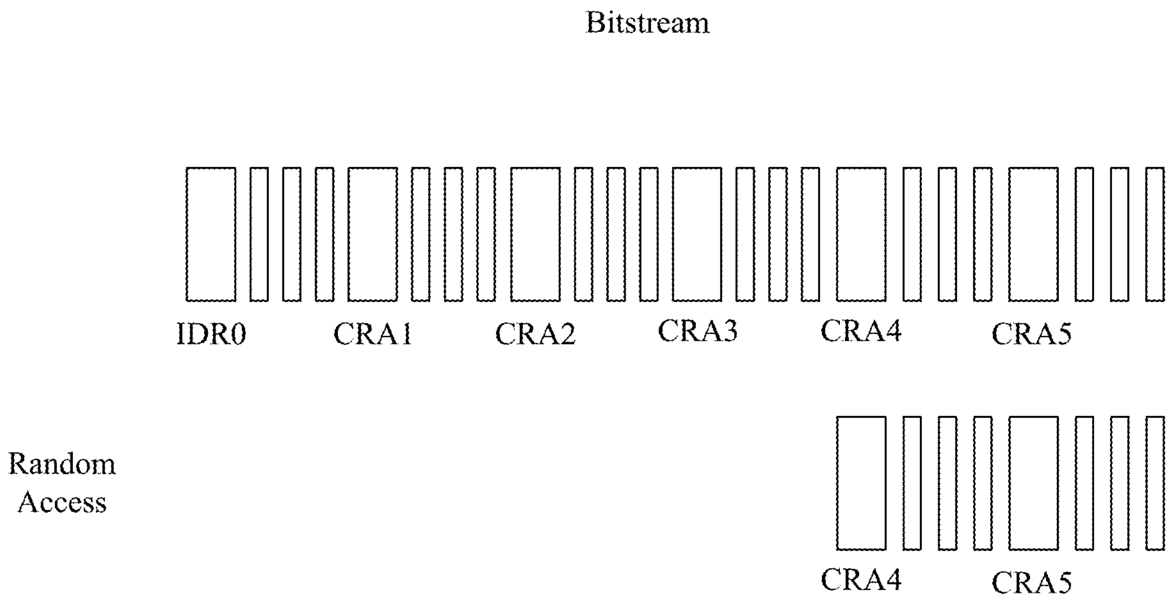
FIG. 1 is a schematic diagram of an example mechanism for random access when decoding a bitstream using intra random access points (IRAP) pictures.

It should be understood at the outset that although an illustrative implementation of one or more embodiments are provided below, the disclosed systems and/or methods may be implemented using any number of techniques, whether currently known or yet to be developed. The disclosure should in no way be limited to the illustrative implementations, drawings, and embodiments illustrated below, including the exemplary designs and implementations illustrated and described herein, but may be modified within the scope of the appended claims along with their full scope of equivalents.

Section headings are used in the present disclosure for ease of understanding and do not limit the applicability of techniques and embodiments disclosed in each section only to that section. Furthermore, H.266 terminology is used in some description only for ease of understanding and not for limiting scope of the disclosed embodiments. As such, the embodiments described herein are applicable to other video codec protocols and designs also. In the present disclosure, editing changes are shown to text by bold italics indicating cancelled text and bold underline indicating added text, with respect to a draft of the Versatile Video Coding (VVC) specification or International Organization for Standardization (ISO) based media file format (ISOBMFF) file format specification.

1. INITIAL DISCUSSION

This disclosure is related to media file formats. Specifically, it is related to signalling of extended dependent random access point (EDRAP) samples a media file. The embodiments may be applied individually or in various combination, to media files according to any media file formats, such as the ISOBMFF and file formats derived from the ISOBMFF.

2. VIDEO CODING INTRODUCTION

2.1 Video Coding Standards

Video coding standards have evolved primarily through the development of the International Telecommunication Union (ITU) telecommunication standardization sector (ITU-T) and ISO/International Electrotechnical Commission (IEC) standards. The ITU-T produced H.261 and H.263, ISO/IEC produced motion picture experts group (MPEG)-1 and MPEG-4 Visual, and the two organizations jointly produced the H.262/MPEG-2 Video and H.264/MPEG-4 Advanced Video Coding (AVC) and H.265/high efficiency video coding (HEVC) [1] standards. Since H.262, the video coding standards are based on the hybrid video coding structure wherein temporal prediction plus transform coding are utilized.

Recently, the Versatile Video Coding (VVC) standard (ITU-T H.266| ISO/IEC 23090-3) [2] and the associated Versatile Supplemental Enhancement Information (VSEI) standard (ITU-T H.274| ISO/IEC 23002-7) [3] is designed for use in a maximally broad range of applications, including both the traditional uses such as television broadcast, video conferencing, or playback from storage media, and also newer and more advanced use cases such as adaptive bit rate streaming, video region extraction, composition and merging of content from multiple coded video bitstreams, multiview video, scalable layered coding, and viewport-adaptive 360° immersive media. The Essential Video Coding (EVC) standard (ISO/IEC 23094-1) is another video coding standard that has recently been developed by MPEG.

2.2 File Format Standards

Media streaming applications are based on the Internet protocol (IP), transmission control protocol (TCP), and hypertext transfer protocol (HTTP) transport methods, and rely on a file format such as the ISO base media file format (ISOBMFF) [4]. One such streaming system is dynamic adaptive streaming over HTTP (DASH) [5]. For using a video format with ISOBMFF and DASH, a file format specification specific to the video format, also referred to as network abstraction layer file format (NALFF) [6], which includes the file format specifications for all network abstraction layer (NAL) units based video codecs such as AVC, HEVC, VVC, and their extensions, would be needed for encapsulation of the video content in ISOBMFF tracks and in DASH representations and segments. Important information about the video bitstreams, e.g., the profile, tier, and level, and many others, would need to be exposed as file format level metadata and/or DASH media presentation description (MPD) for content selection purposes, e.g., for selection of appropriate media segments both for initialization at the beginning of a streaming session and for stream adaptation during the streaming session. Similarly, for using an image format with ISOBMFF, a file format specification specific to the image format, such as the AVC image file format and the HEVC image file format in [7], would be needed.

2.3 Random Access and its Supports in HEVC and VVC

Random access refers to starting access and decoding of a bitstream from a picture that is not the first picture of the bitstream in decoding order. To support tuning in and channel switching in broadcast, multicast, and multiparty video conferencing, seeking in local playback and streaming, as well as stream adaptation in streaming, the bitstream should include frequent random-access points. Such random-access points may be intra coded pictures, but may also be inter-coded pictures, for example in the case of gradual decoding refresh.

HEVC includes signaling of intra random access points (IRAP) pictures in a NAL unit header through NAL unit types. Three types of IRAP pictures are supported in HEVC. These are instantaneous decoder refresh (IDR), clean random access (CRA), and broken link access (BLA) pictures. IDR pictures constrain the inter-picture prediction structure to not reference any picture before the current group-of-pictures (GOP). The reference pictures in the current GOP may be referred to as closed-GOP random access points. CRA pictures are less restrictive by allowing certain pictures to reference pictures before the current GOP, all of which are discarded in case of a random access. CRA pictures may be referred to as open-GOP random access points. BLA pictures usually originate from splicing of two bitstreams or part thereof at a CRA picture, for example during stream switching. To enable better systems usage of IRAP pictures, six different NAL units are defined to signal the properties of the IRAP pictures. Such properties can be used to better match the stream access point types as defined in the ISOBMFF [4], which are utilized for random access support in dynamic adaptive streaming over hypertext transfer protocol (DASH) [5].

VVC supports three types of IRAP pictures, two types of IDR pictures (one type with and the other type without associated random access decodable leading (RADL) pictures), and one type of CRA picture. These are used in a similar manner as in HEVC. The BLA picture types in HEVC are not included in VVC for two reasons. First, the basic functionality of BLA pictures can be realized by CRA pictures plus the end of sequence NAL unit, the presence of which indicates that the subsequent picture starts a new coded video sequence (CVS) in a single-layer bitstream. Second, there is a desire in specifying fewer NAL unit types than HEVC during the development of VVC, as indicated by the use of five bits instead of six bits for the NAL unit type field in the NAL unit header.

Another difference in random access support between VVC and HEVC is the support of gradual decoding refresh (GDR) in a more normative manner in VVC. In GDR, the decoding of a bitstream can start from an inter-coded picture. At the beginning of an access, the entire picture region cannot be correctly decoded. However, after a number of pictures the entire picture region is correctly decoded. AVC and HEVC also support GDR by using a recovery point supplemental enhancement information (SEI) message for signaling of GDR random access points and recovery points. In VVC, a NAL unit type is specified for indication of GDR pictures and the recovery point is signaled in the picture header syntax structure. A coded video sequence (CVS) and a bitstream are allowed to start with a GDR picture. This means that an entire bitstream is allowed to contain only inter-coded pictures without a single intra-coded picture. The main benefit of specifying GDR support this way is to provide a conforming behavior for GDR. GDR enables encoders to smooth the bit rate of a bitstream by distributing intra-coded slices or blocks in multiple pictures as opposed intra coding entire pictures. This allows significant end-to-end delay reduction, which is considered more important in many cases as ultralow delay applications like wireless display, online gaming, and drone-based applications become more popular.

Another GDR related feature in VVC is virtual boundary signaling. The boundary between the refreshed region, which is the correctly decoded region, and the unrefreshed region at a picture between a GDR picture and a corresponding recovery point can be signaled as a virtual boundary. When signaled, in-loop filtering across the boundary is not be applied. Thus, a decoding mismatch for some samples at or near the boundary would not occur. This can be useful when the application determines to display the correctly decoded regions during the GDR process. IRAP pictures and GDR pictures can be collectively referred to as random access point (RAP) pictures.

2.4 Extended Dependent Random Access Point (EDRAP) Based Video Coding, Storage, and Streaming 2.4.1 the Concept and the Standard Support The concept of EDRAP based video coding, storage, and streaming is described herein.

As shown in FIG. 1, the application (e.g., adaptive streaming) determines the frequency of random access points (RAPs), e.g., RAP period 1 s or 2 s. In an example, RAPs are provided by coding of IRAP pictures. Note that inter prediction references for the non-key pictures between RAP pictures are not shown, and from left to right is the output order. When random accessing from CRA4, the decoder receives and correctly decodes CRA4, CRA5, etc., and related inter predicted pictures.

Figure 2:
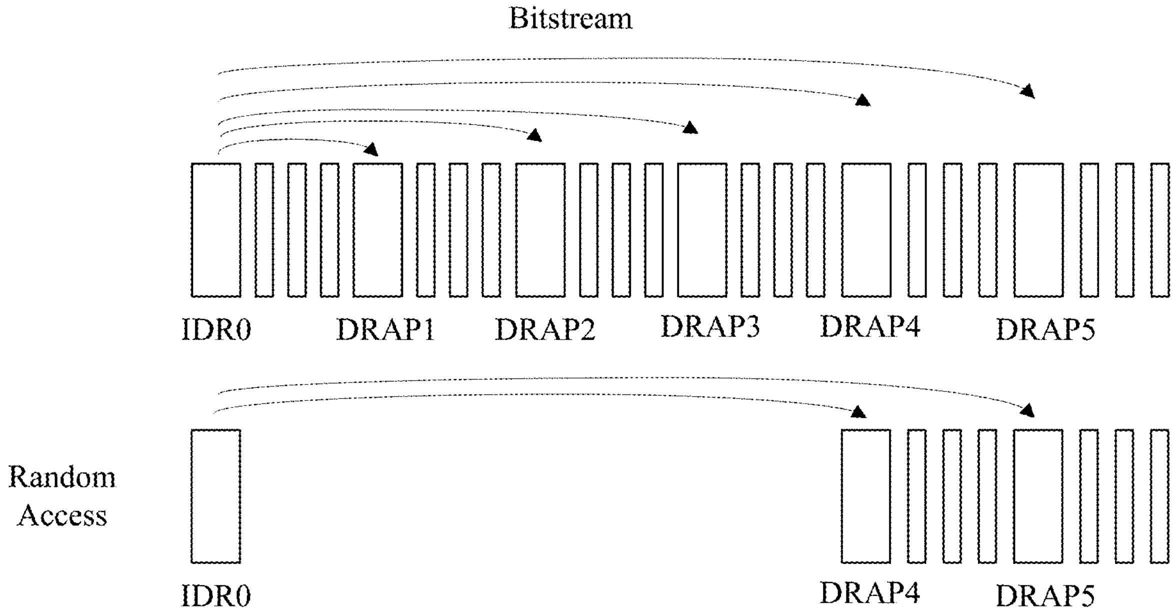
FIG. 2 is a schematic diagram of an example mechanism for random access when decoding a bitstream using dependent random access point (DRAP) pictures.

FIG. 2 illustrates the DRAP approach, which provides improved coding efficiency by allowing a DRAP picture (and subsequent pictures) to refer to the previous IRAP picture for inter prediction. Note that inter prediction for the non-key pictures between RAP pictures are not shown, and from left to right is the output order. When random accessing from DRAP4, the decoder receives and correctly decodes IDR0, DRAP4, DRAP5, etc., and related inter predicted pictures.

Figure 3:
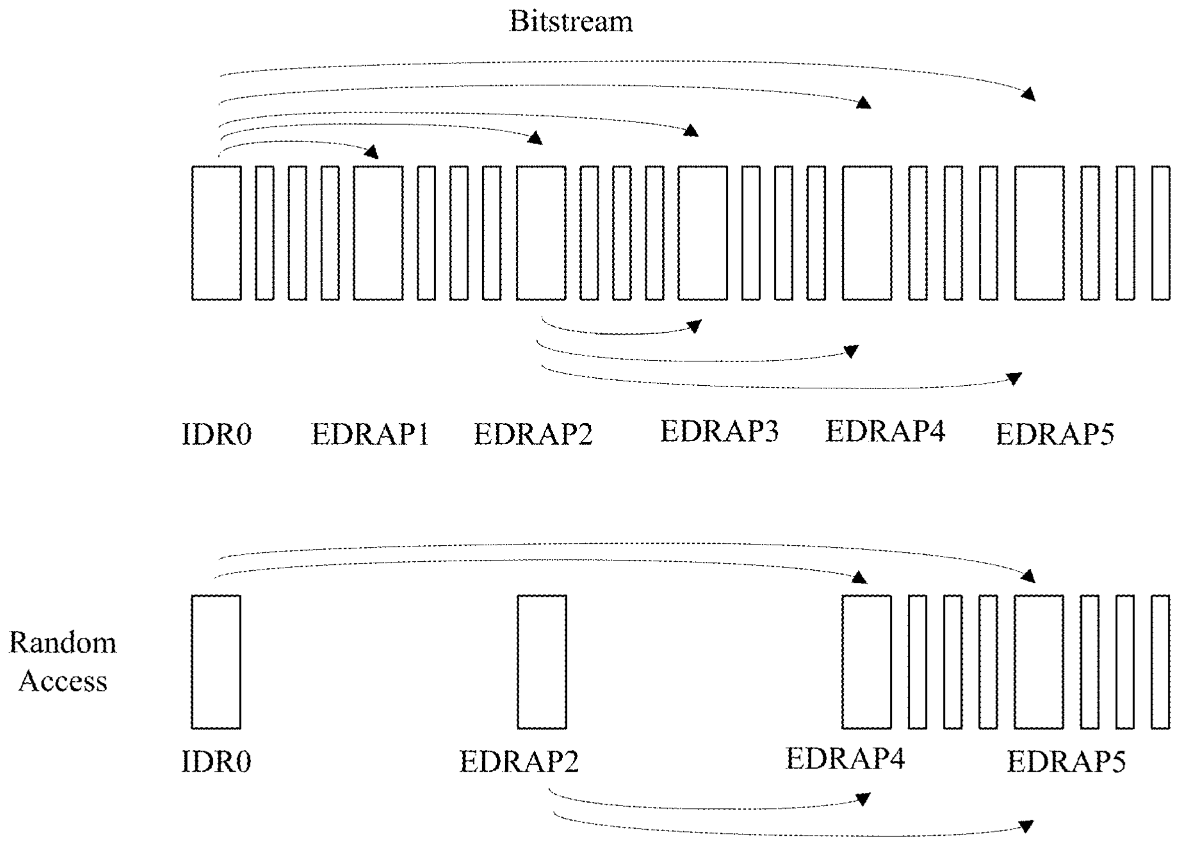
FIG. 3 is a schematic diagram of an example mechanism for random access when decoding a bitstream using extended dependent random access point (EDRAP) pictures.

FIG. 3 illustrates the EDRAP approach, which provides a bit more flexibility by allowing an EDRAP picture (and subsequent pictures) to refer to a few of the earlier RAP pictures (IRAP or EDRAP). Note that inter prediction for the non-key pictures between RAP pictures are not shown, and from left to right is the output order. When random accessing from EDRAP4, the decoder receives and correctly decodes IDR0, EDRAP2, EDRAP4, EDRAP5, etc., and related inter predicted pictures.

Figure 4:
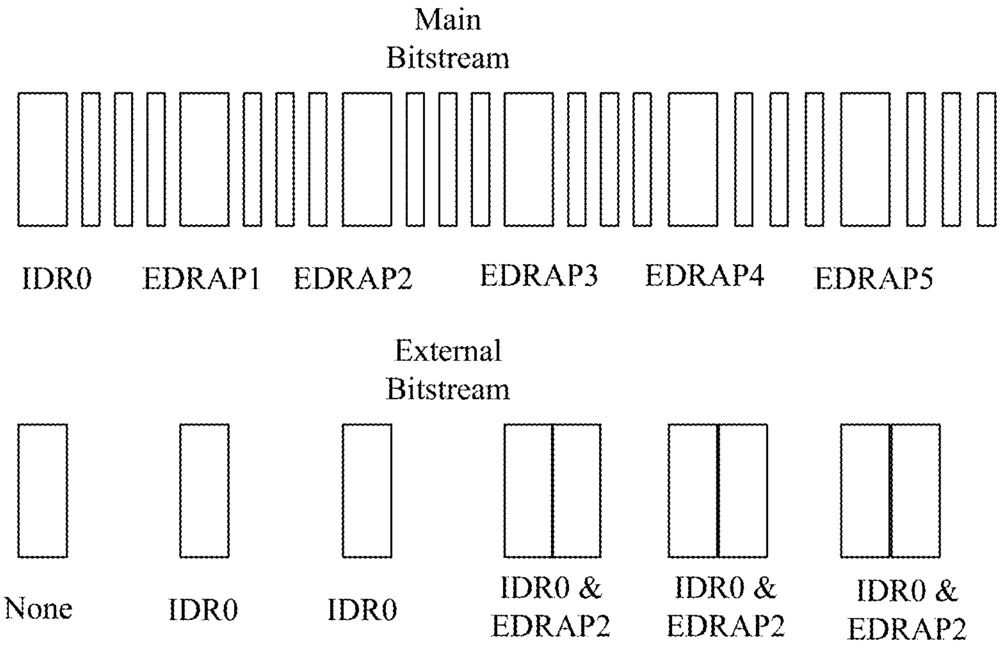
FIG. 4 is a schematic diagram of an example mechanism for signaling an external bitstream to support EDRAP based random access.
Figure 5:
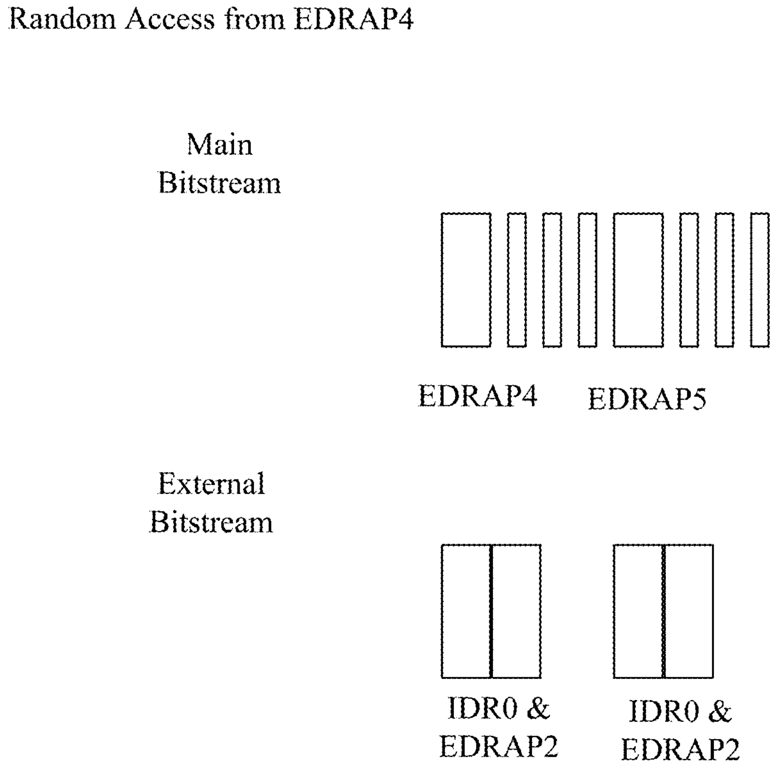
FIG. 5 illustrates an example of EDRAP based random access.

FIG. 4 illustrates an example of the EDRAP approach using main stream representation (MSR) segments and external stream representation (ESR) segments. FIG. 5 illustrates an example of random access from EDRAP4. When random accessing from or switching to the segment starting at EDRAP4, the decoder receives and decodes segments including IDR0, EDRAP2, EDRAP4, EDRAP5, etc., and related inter predicted pictures.

EDRAP based video coding is supported by the EDRAP indication supplemental enhancement information (SEI) message included in the second edition of the VSEI standard [3]; the storage part is supported by the EDRAP sample group and the associated external stream track reference included in [8], an edition of the ISOBMFF standard; and the streaming part is supported by the main stream representation (MSR) and external stream representation (ESR) descriptors included in [9], an amendment to the DASH standard. These standard supports are described below.

2.4.2 the EDRAP Indication SEI Message

The syntax and semantics of the EDRAP indication SEI message are as follows.

| | Descriptor |
|---|---|
| extended__drap__indication( payloadSize ) { | |
| edrap__rap__id__minus1 | u(16) |
| edrap__leading__pictures__decodable__flag | u(1) |
| edrap__reserved__zero__12bits | u(12) |

-continued

| | Descriptor |
|---|---|
| edrap__num__ref__rap__pics__minus1 | u(3) |
| for( i = 0; i <= edrap__num__ref__rap__pics__minus1; i++) | |
| edrap__ref__rap__id[ i ] | u(16) |
| } | |

The picture associated with an extended DRAP (EDRAP) indication SEI message is referred to as an EDRAP picture.

The presence of the EDRAP indication SEI message indicates that the constraints on picture order and picture referencing specified in this clause apply. These constraints can enable a decoder to properly decode the EDRAP picture and the pictures that are in the same layer and follow it in both decoding order and output order without needing to decode any other pictures in the same layer except the list of pictures referenceablePictures, which includes a list of IRAP or EDRAP pictures in decoding order that are within the same CLVS and identified by the edrap_ref_rap_id[i] syntax elements.

The constraints indicated by the presence of the EDRAP indication SEI message, which shall all apply, are as follows: The EDRAP picture is a trailing picture. The EDRAP picture has a temporal sublayer identifier equal to 0. The EDRAP picture does not include any pictures in the same layer in the active entries of its reference picture lists except the referenceablePictures. Any picture that is in the same layer and follows the EDRAP picture in both decoding order and output order does not include, in the active entries of its reference picture lists, any picture that is in the same layer and precedes the EDRAP picture in decoding order or output order, with the exception of the referenceablePictures. Any picture in the list referenceablePictures does not include, in the active entries of its reference picture lists, any picture that is in the same layer and is not a picture at an earlier position in the list referenceablePictures. NOTE—Consequently, the first picture in referenceablePictures, even when it is an EDRAP picture instead of an IRAP picture, does not include any picture from the same layer in the active entries of its reference picture lists.

edrap_rap_id_minus1 plus 1 specifies the RAP picture identifier, denoted as RapPicId, of the EDRAP picture.

Each IRAP or EDRAP picture is associated with a RapPicId value. The RapPicId value for an IRAP picture is inferred to be equal to 0. The RapPicId values for any two EDRAP pictures associated with the same IRAP picture shall be different.

edrap_leading_pictures_decodable_flag equal to 1 specifies that both of the following constraints apply: Any picture that is in the same layer and follows the EDRAP picture in decoding order shall follow, in output order, any picture that is in the same layer and precedes the EDRAP picture in decoding order. Any picture that is in the same layer and follows the EDRAP picture in decoding order and precedes the EDRAP picture in output order shall not include, in the active entries of its reference picture lists, any picture that is in the same layer and precedes the EDRAP picture in decoding order, with the exception of the referenceablePictures.

edrap_leading_pictures_decodable_flag equal to 0 does not impose such constraints.

edrap_reserved_zero_12 bits shall be equal to 0 in bitstreams conforming to this version of this Specification. Other values for edrap_reserved_zero_12 bits are reserved for use by ITU-T| ISO/IEC. Decoders shall ignore the value of edrap_reserved_zero_12 bits.

edrap_num_ref_rap_pics_minus1 plus 1 indicates the number of IRAP or EDRAP pictures that are within the same CLVS as the EDRAP picture and may be included in the active entries of the reference picture lists of the EDRAP picture.

edrap_ref_rap_id[i] indicates RapPicId of the i-th RAP picture that may be included in the active entries of the reference picture lists of the EDRAP picture. The i-th RAP picture shall be either the IRAP picture associated with the current EDRAP picture or an EDRAP picture associated with the same IRAP picture as the current EDRAP picture.

2.4.3 the EDRAP Sample Group and Associated External Stream Track Reference

The specifications of the EDRAP sample group and the associated external stream track reference in [8] are as follows.

3.1 Definitions

. . .

EDRAP Sample

A sample for which all subsequent samples in both decoding and output order can be correctly decoded provided that the closest preceding SAP sample of type 1, 2, or 3 and zero or more preceding EDRAP samples are available when decoding the sample and the subsequent samples. Note 1 to entry. The closest preceding SAP sample of type 1, 2, or 3 and the zero or more preceding EDRAP samples as described above are referred to as the required preceding SAP and EDRAP samples of the EDRAP sample.

3.2 Abbreviated Terms

. . .

EDRAP Extended Dependent Random Access Point

. . .

8.3.3.4.1 Associated External Stream Track Reference

A track reference of type 'aest' (meaning "associated external stream track") may be included in a media track.

When a media track has a track reference of type 'aest', the following applies:

- The media track should have at least one sample identified as an EDRAP sample by being associated with an EDRAP sample group.
- The referenced track shall comply to the following constraints:
  - Each sample in the referenced track shall be identified as a sync sample.
  - The referenced track shall have both header flags track_in_movie and track_in_preview equal to 0.
  - The referenced track shall use a restricted scheme as follows:
    - The scheme_type field in the SchemeTypeBox, which is in the RestrictedSchemeInfoBox, is equal to 'spkt' and the value of the mode field in the SamplePackingInformationBox is equal to 1.
    - Bit 0 of the flags field of the SchemeTypeBox is equal to 0, such that the value of (flags & 0x000001) is equal to 0.
- For each EDRAP sample sampleA in the media track, there shall be one and only one sample sampleB in the referenced track that has the same decoding time as sampleA, and sampleB shall contain all media data of the required preceding SAP and EDRAP samples of sampleA.

8.15.6 Sample-Packed Tracks 8.15.6.1 Introduction

When a restricted scheme with Scheme Type 'spkt' is in use for a track, a sample associated with the sample entry may be a packed sample, e.g., it may contain more than one sample of an original track. Such a current track is referred to as a sample-packed track.

8.15.6.2 Sample Packing Information Box 8.15.6.2.1 Definition

Box Type: 'spki'

Container: SchemeInformationBox

Mandatory: Yes (when the SchemeType is 'spkt')

Quantity: One 8.15.6.2.2 Syntax

```
aligned(8) class SamplePackingInformationBox extends FullBox('spki',
version = 0, flags = 0)
{
  unsigned int(8) mode;
}
```

8.15.6.2.1 Semantics mode equal to 0 specifies that all the samples of the original streams have been preserved. The value 1 specifies that only some samples have been preserved. All other values are reserved for future use.

10.11 Extended DRAP (EDRAP) Sample Group 10.11.1 Definition

The EDRAP sample group documents some of all of the EDRAP samples in a track. This sample group is similar to the DRAP sample group; however, it enables signalling additional samples that can also be used for random access that have more flexible dependencies.

NOTE 1. Similarly as for DRAP samples, EDRAP samples can only be used in combination with SAP samples of type 1, 2 and 3.

NOTE 2. A DRAP sample is always an EDRAP sample.

The following applies for any EDRAP sample sampleA that is mapped to an EDRAP sample group:

- Let sampleSeq be a sequence of samples consisting of the following samples in the order of the bullets below:
  - the closest preceding SAP sample of type 1, 2, or 3,
  - the EDRAP samples identified by ref_edrap_idx_delta [i] for i in the range of 0 to num_ref_edrap_samples−1, inclusive, in decoding order,
  - sampleA, and
  - all samples following sampleA in both decoding and output order in the track.
- For each sample sampleB in sampleSeq, all data needed for processing sampleB shall be accessible in the referenced sample entry, in sampleB itself, or in any sample that precedes sampleB in decoding order and is present in sampleSeq.

NOTE 3. For some video codecs, all data needed for processing a sample sampleB includes parameter sets needed for decoding sampleB.

10.11.2 Syntax

```
class VisualEdrapEntry( ) extends VisualSampleGroupEntry('edrp') {
  unsigned int(3) edrap_type;
  unsigned int(3) num_ref_edrap_samples;
  unsigned int(2) reserved = 0;
  for(i=0; i<num_ref_edrap_samples; i++)
    unsigned int(16) ref_edrap_idx_delta[i];
}
```

10.11.3 Semantics edrap_type is a non-negative integer. When edrap_type is in the range of 1 to 3 it indicates the SAP_type (as specified in Annex I) that the EDRAP sample would have corresponded to, had it not depended on the closest preceding SAP or other EDRAP samples. Other values of edrap_type are reserved.

NOTE 1. An EDRAP sample and all the subsequent samples in the same track may depend on the closest preceding SAP and/or some preceding EDRAP samples and does not depend on any other samples preceding the EDRAP sample. Therefore, if the encoder chooses to encode an EDRAP sample such that it does not depend on the closest preceding SAP or any preceding EDRAP sample, then the EDRAP sample becomes a SAP.

num_ref_edrap_samples indicates the number of other EDRAP samples that are earlier in decoding order than the EDRAP sample and are needed for reference to be able to correctly decode the EDRAP sample and all samples following the EDRAP sample in both decoding and output order when starting decoding from the EDRAP sample.

NOTE 2. An EDRAP sample which is also a DRAP sample would have num_ref_edrap_samples equal to 0.

reserved shall be equal to 0. The semantics of this subclause only apply to sample group description entries with reserved equal to 0. Parsers shall ignore sample group description entries when reserved is greater than 0.

ref_edrap_idx_delta[i] indicates the i-th required preceding EDRAP sample of the current EDRAP sample. Let the list of EDRAP samples associated with a SAP sample of type 1, 2 or 3 be all the EDRAP samples following the SAP sample and preceding the next SAP sample, when present. The EDRAP sample index is defined as the index to this list of EDRAP samples. The value of ref_edrap_idx_delta[i] is equal to the EDRAP sample index of the current EDRAP sample and the EDRAP sample index of the i-th required preceding EDRAP sample. The value 1 indicates that the i-th EDRAP sample is the last EDRAP sample preceding this EDRAP sample in decoding order, the value 2 indicates that the i-th EDRAP sample is the second last EDRAP sample preceding this EDRAP sample in decoding order, and so on.

3. TECHNICAL PROBLEMS ADDRESSED BY DISCLOSED EMBODIMENTS

Example designs for the storage part of EDRAP based media coding, storage, and streaming are associated with the following problems.

First, as with any track reference, unless disallowed, the 'aest' track reference can refer to multiple tracks or track groups. Consequently, the phrase of "the referenced track" is unclear.

Second, it is assumed that the closest preceding SAP sample of type 1, 2, or 3 is always needed for random accessing from an EDRAP sample. However, that assumption is at odds with the EDRAP design in the VSEI specification, wherein the previous IRAP picture in decoding order may or may not be needed for random accessing from an EDRAP picture.

4. A LISTING OF SOLUTIONS AND EMBODIMENTS

To address one or more of the above-described problems, methods as summarized below are disclosed. The examples should be considered as examples to explain the general concepts and should not be interpreted in a narrow way. Furthermore, these examples can be applied individually or combined in any manner.

Example 1

To address drawbacks of the first problem, in an example, one of the following aspects is specified, and the referenced track is the track for which the track ID is the first entry in the TrackReferenceTypeBox with reference_type equal to 'aest'.

When present, the TrackReferenceTypeBox with reference_type equal to 'aest' shall contain only a track identifier and shall not contain any track group identifier.

When present, the TrackReferenceTypeBox with reference_type equal to 'aest' shall contain in the first entry a track identifier and other entries, if any, contain track group identifiers.

When present, the first entry in the TrackReferenceTypeBox with reference_type equal to 'aest' shall be a track identifier.

Example 2

To address drawbacks of the second problem, in an example, it is specified that the closest preceding SAP sample of type 1, 2, or 3 may or may not be needed for random accessing from an EDRAP sample. One or more of the following aspects are specified.

In an example, the term EDRAP sample is defined as follows: An EDRAP sample is a sample for which all subsequent samples in both decoding and output order can be correctly decoded provided that the required preceding SAP or EDRAP samples are available for decoding the sample and the subsequent samples, where the required preceding SAP or EDRAP samples consist of one or more of the set of samples starting from the closest preceding SAP sample of type 1, 2, or 3 in decoding order closestSapSample, and including all EDRAP samples between closestSapSample and the sample in decoding order.

In an example, the term EDRAP sample is defined as follows: An EDRAP sample is a sample for which all subsequent samples in both decoding and output order can be correctly decoded provided that the required preceding SAP or EDRAP samples are available for decoding the sample and the subsequent samples, where the required preceding SAP or EDRAP samples consist of zero or more of the set of samples starting from the closest preceding SAP sample of type 1, 2, or 3 in decoding order closestSapSample, and including all EDRAP samples between closestSapSample and the sample in decoding order.

In an example, when a media track has a track reference of type 'aest', for each EDRAP sample sampleA in the media track, there shall be one and only one sample sampleB in the referenced track that has the same decoding time as sampleA, and sampleB shall contain all media data of the required preceding SAP or EDRAP samples of sampleA.

In an example, for any EDRAP sample sampleA that is mapped to an EDRAP sample group, the following applies:

Let sampleSeq be a sequence of samples consisting of the following samples in the order of the bullets below:
- the SAP or EDRAP samples identified by ref_sap_or_edrap_idx_delta[i] for i in the range of 0 to num_ref_sap_or_edrap_samples_minus1, inclusive, in decoding order,
- sampleA, and
- all samples following sampleA in both decoding and output order in the track.

For each sample sampleB in sampleSeq, all data needed for processing sampleB shall be accessible in the referenced sample entry, in sampleB itself, or in any sample that precedes sampleB in decoding order and is present in sampleSeq.

In an example, the syntax of VisualEdrapEntry( ) is specified as follows:

```
class VisualEdrapEntry( ) extends VisualSampleGroupEntry('edrp') {
  unsigned int(3) edrap_type;
  unsigned int(3) num_ref_sap_or_edrap_samples_minus1;
  unsigned int(2) reserved = 0;
    for(i=0; i<=num_ref_sap_or_edrap_samples_minus1; i++)
    unsigned int(16) ref_sap_or_edrap_idx_delta[i];
}
```

In an example, the semantics of num_ref_sap_or_edrap_samples_minus1 is specified as follows.

num_ref_sap_or_edrap_samples_minus1 plus 1 indicates the number of samples in the required preceding SAP or EDRAP samples, which are earlier in decoding order than the EDRAP sample and are needed for reference to be able to correctly decode the EDRAP sample and all samples following the EDRAP sample in both decoding and output order when starting decoding from the EDRAP sample.

In an example, the semantics of ref_sap_or_edrap_idx_delta[i] is specified as follows:

ref_sap_or_edrap_idx_delta[i] indicates the i-th required preceding SAP or EDRAP sample of the current EDRAP sample. Let the list of SAP or EDRAP samples associated with a SAP sample of type 1, 2 or 3 be the SAP sample and all the EDRAP samples following the SAP sample and preceding the next SAP sample, when present. The SAP_or_EDRAP sample index is defined as the index to this list of SAP or EDRAP samples. The value of ref_sap_or_edrap_idx_delta[i] is equal to the difference between the SAP_or_EDRAP sample index of the current EDRAP sample and the SAP_or_EDRAP sample index of the i-th required preceding SAP or EDRAP sample. The value 1 indicates that the i-th required SAP or EDRAP sample is the last SAP or EDRAP sample preceding this EDRAP sample in decoding order, the value 2 indicates that the i-th required SAP or EDRAP sample is the second last EDRAP sample preceding this EDRAP sample in decoding order, and so on.

5. EMBODIMENTS

Below are some example embodiments for some of the disclosure items summarized above in section 4. Most relevant parts that have been added or modified are shown in underlined bold font, and some of the deleted parts are shown in italicized bold fonts. There may be some other changes that are editorial in nature and thus not highlighted.

5.1 First Embodiment

This embodiment is for items 1 and 2.

3.1 Definitions

. . .

EDRAP Sample sample for which all subsequent samples in both decoding and output order can be correctly decoded provided that the closest preceding SAP sample of type 1, 2, or 3 and zero or more preceding EDRAP samples are available when decoding the sample and the subsequent samples the required preceding SAP or EDRAP samples are available for decoding the sample and the subsequent samples, where the required preceding SAP or EDRAP samples consist of one or more of the set of samples starting from the closest preceding SAP sample of type 1, 2, or 3 in decoding order closestSapSample, and including all EDRAP samples between closestSapSample and the sample in decoding order Note 1 to entryThe closest preceding SAP sample of type 1, 2, or 3 and the zero or more preceding EDRAP samples as described above are referred to as the required preceding SAP and EDRAP samples of the EDRAP sample 8.3.3.4.1 Associated External Stream Track Reference A track reference of type 'aest' (meaning "associated external stream track") may be included in a media track. When present, the TrackReferenceTypeBox with reference_type equal to 'aest' shall contain only a track identifier and shall not contain any track group identifier.

When a media track has a track reference of type 'aest', the following applies:
- The media track should have at least one sample identified as an EDRAP sample by being associated with an EDRAP sample group.
- The referenced track shall comply to the following constraints:
  - Each sample in the referenced track shall be identified as a sync sample.
  - The referenced track shall have both header flags track_in_movie and track_in_preview equal to 0.
  - The referenced track shall use a restricted scheme as follows:
    - The scheme_type field in the SchemeTypeBox, which is in the RestrictedSchemeInfoBox, is equal to 'spkt' and the value of the mode field in the SamplePackingInformationBox is equal to 1.
    - Bit 0 of the flags field of the SchemeTypeBox is equal to 0, such that the value of (flags & 0x000001) is equal to 0.
- For each EDRAP sample sampleA in the media track, there shall be one and only one sample sampleB in the referenced track that has the same decoding time as sampleA, and sampleB shall contain all media data of the required preceding SAP and or EDRAP samples of sampleA.

10.11 EDRAP Sample Group

10.11.1 Definition

The EDRAP sample group documents some of all of the EDRAP samples in a track. This sample group is similar to the DRAP sample group; however, it enables signalling additional samples that can also be used for random access that have more flexible dependencies.

NOTE 1 Similarly as for DRAP samples, EDRAP samples can only be used in combination with SAP samples of type 1, 2 and 3.

NOTE 1 A DRAP sample is always an EDRAP sample.

The following applies for any EDRAP sample sampleA that is mapped to an EDRAP sample group:

Let sampleSeq be a sequence of samples consisting of the following samples in the order of the bullets below:
- the closest preceding SAP sample of type 1, 2, or 3,
- the SAP or EDRAP samples identified by ref_sap_or_edrap_idx_delta[i] for i in the range of 0 to num_ref_edrap_samples−1 num_ref_sap_or_edrap_samples_minus1, inclusive, in decoding order,
- sampleA, and
- all samples following sampleA in both decoding and output order in the track.

For each sample sampleB in sampleSeq, all data needed for processing sampleB shall be accessible in the referenced sample entry, in sampleB itself, or in any sample that precedes sampleB in decoding order and is present in sampleSeq.

NOTE 2 For some video codecs, all data needed for processing a sample sampleB includes parameter sets needed for decoding sampleB.

10.11.2 Syntax

```
class VisualEdrapEntry( ) extends VisualSampleGroupEntry('edrp') {
  unsigned int(3) edrap_type;
  unsigned int(3) num_ref_edrap_samples;
  unsigned int(3)num_ref_sap_or_edrap_samples_minus1;
  unsigned int(2) reserved = 0;
  for(i=0; i<num_ref_edrap_samples; i++)
    unsigned int(16) ref_edrap_idx_delta[i];
  for(i=0; i <= num_ref_sap_or_edrap_samples_minus1; i++)
    unsigned int(16)ref_sap_or_edrap_idx_delta[i];
}
```

10.11.3 Semantics edrap_type is a non-negative integer. When edrap_type is in the range of 1 to 3 it indicates the SAP_type (as specified in Annex I) that the EDRAP sample would have corresponded to, had it not depended on the closest preceding SAP or other EDRAP samples. Other values of edrap_type are reserved.

NOTE 1. An EDRAP sample and all the subsequent samples in the same track may depend on the closest preceding SAP and/or some preceding EDRAP samples and does not depend on any other samples preceding the EDRAP sample. Therefore, if the encoder chooses to encode an EDRAP sample such that it does not depend on the closest preceding SAP or any preceding EDRAP sample, then the EDRAP sample becomes a SAP.

num_ref_edrap_samples indicates the number of other EDRAP samples that are earlier in decoding order than the EDRAP sample and are needed for reference to be able to correctly decode the EDRAP sample and all samples following the EDRAP sample in both decoding and output order when starting decoding from the EDRAP sample.

NOTE 2 An EDRAP sample which is also a DRAP sample would have num_ref_edrap_samples equal to 0.

preceding SAP or any preceding EDRAP sample, then the EDRAP sample becomes a SAP.

num_ref_sap_or_edrap_samples_minus1 plus 1 indicates the number of samples in the required preceding SAP or EDRAP samples, which are earlier in decoding order than the EDRAP sample and are needed for reference to be able to correctly decode the EDRAP sample and all samples following the EDRAP sample in both decoding and output order when starting decoding from the EDRAP sample.

NOTE 2. For an EDRAP sample that is also a DRAP sample, the value of num_ref_sap_or) edrap_samples_minus1 is equal to 0.

reserved shall be equal to 0. The semantics of this subclause only apply to sample group description entries with reserved equal to 0. Parsers shall ignore sample group description entries when reserved is greater than 0.

ref_edrap_idx_delta[i] indicates the i-th required preceding EDRAP sample of the current EDRAP sample. Let the list of EDRAP samples associated with a SAP sample of type 1, 2 or 3 be all the EDRAP samples following the SAP sample and preceding the next SAP sample, when present. The EDRAP sample index is defined as the index to this list of EDRAP samples. The value of ref_edrap_idx_delta[i] is equal to the EDRAP sample index of the current EDRAP sample and the EDRAP sample index of the i-th required preceding EDRAP sample. The value 1 indicates that the i-th EDRAP sample is the last EDRAP sample preceding this EDRAP sample in decoding order, the value 2 indicates that the i-th EDRAP sample is the second last EDRAP sample preceding this EDRAP sample in decoding order, and so on.

ref_sap_or_edrap_idx_delta[i] indicates the i-th required preceding SAP or EDRAP sample of the current EDRAP sample. Let the list of SAP or EDRAP samples associated with a SAP sample of type 1, 2 or 3 be the SAP sample and all the EDRAP samples following the SAP sample and preceding the next SAP sample, when present. The SAP_or_EDRAP sample index is defined as the index to this list of SAP or EDRAP samples. The value of ref_sap_or_edrap_idx_delta[i] is equal to the difference between the SAP_or_EDRAP sample index of the current EDRAP sample and the SAP_or_EDRAP sample index of the i-th required preceding SAP or EDRAP sample. The value 1 indicates that the i-th required SAP or EDRAP sample is the last SAP or EDRAP sample preceding this EDRAP sample in decoding order, the value 2 indicates that the i-th required SAP or EDRAP sample is the second last EDRAP sample preceding this EDRAP sample in decoding order, and so on.

6. REFERENCES

[1] ITU-T and ISO/IEC. "High efficiency video coding". Rec. ITU-T H.265| ISO/IEC 23008-2 (in force edition).

[2] Rec. ITU-T H.266| ISO/IEC 23090-3. "Versatile Video Coding".

[3] Rec. ITU-T Rec. H.274| ISO/IEC 23002-7. "Versatile Supplemental Enhancement Information Messages for Coded Video Bitstreams".

[4] ISO/IEC 14496-12: "Information technology—Coding of audio-visual objects-Part 12: ISO base media file format".

[5] ISO/IEC 23009-1: "Information technology—Dynamic adaptive streaming over HTTP (DASH)—Part 1: Media presentation description and segment formats".

[6] ISO/IEC 14496-15: "Information technology—Coding of audio-visual objects—Part 15: Carriage of network abstraction layer (NAL) unit structured video in the ISO base media file format".

[7] ISO/IEC 23008-12: "Information technology—High efficiency coding and media delivery in heterogeneous environments—Part 12: Image File Format".

[8] ISO/IEC JTC 1/SC 29/WG 03 output document N0651, "Text of ISO/IEC DIS 14496-12 8th edition ISO Base Media File Format", September 2022.

[9] ISO/IEC JTC 1/SC 29/WG 03 output document N0630, "WD of ISO/IEC 23009-1 5th edition AMD 2 EDRAP streaming and other extensions", July 2022.

Figure 6:
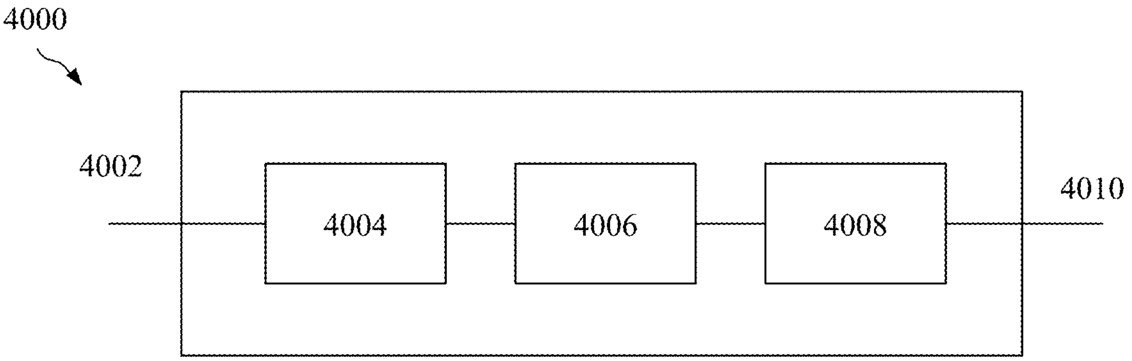
FIG. 6 is a block diagram showing an example video processing system.

FIG. 6 is a block diagram showing an example video processing system 4000 in which various embodiments disclosed herein may be implemented. Various implementations may include some or all of the components of the system 4000. The system 4000 may include input 4002 for receiving video content. The video content may be received in a raw or uncompressed format, e.g., 8- or 10-bit multi-component pixel values, or may be in a compressed or encoded format. The input 4002 may represent a network interface, a peripheral bus interface, or a storage interface. Examples of network interface include wired interfaces such as Ethernet, passive optical network (PON), etc., and wireless interfaces such as wireless fidelity (Wi-Fi) or cellular interfaces.

The system 4000 may include a coding component 4004 that may implement the various coding or encoding methods described in the present disclosure. The coding component 4004 may reduce the average bitrate of video from the input 4002 to the output of the coding component 4004 to produce a coded representation of the video. The coding techniques are therefore sometimes called video compression or video transcoding techniques. The output of the coding component 4004 may be either stored, or transmitted via a communication connected, as represented by the component 4006. The stored or communicated bitstream (or coded) representation of the video received at the input 4002 may be used by a component 4008 for generating pixel values or displayable video that is sent to a display interface 4010. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or DisplayPort, and so on. Examples of storage interfaces include serial advanced technology attachment (SATA), peripheral component interconnect (PCI), integrated drive electronics (IDE) interface, and the like. The embodiments described in the present disclosure may be embodied in various electronic devices such as mobile phones, laptops, smartphones or other devices that are capable of performing digital data processing and/or video display.

Figure 7:
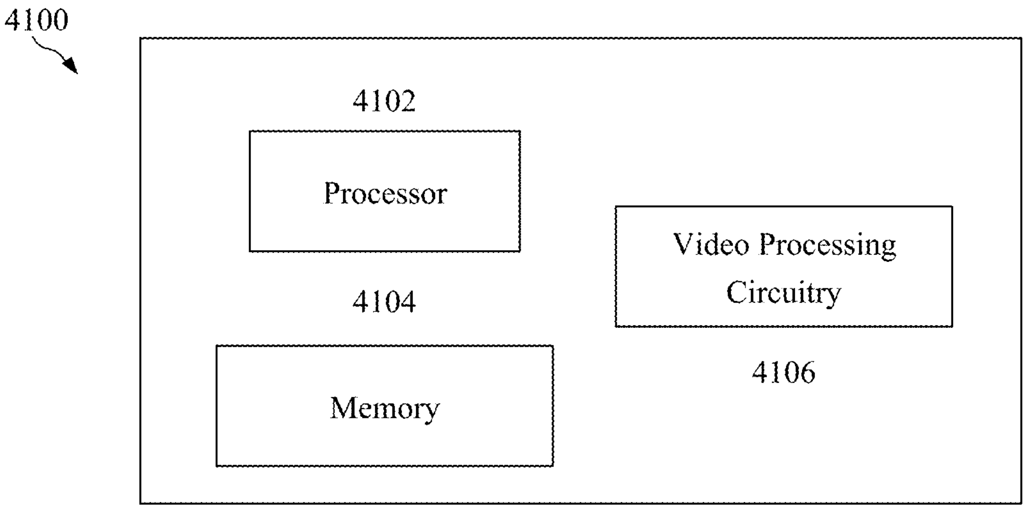
FIG. 7 is a block diagram of an example video processing apparatus.

FIG. 7 is a block diagram of an example video processing apparatus 4100. The apparatus 4100 may be used to implement one or more of the methods described herein. The apparatus 4100 may be embodied in a smartphone, tablet, computer, Internet of Things (IoT) receiver, and so on. The apparatus 4100 may include one or more processors 4102, one or more memories 4104 and video processing circuitry 4106. The processor(s) 4102 may be configured to implement one or more methods described in the present disclosure. The memory (memories) 4104 may be used for storing data and code used for implementing the methods and embodiments described herein. The video processing circuitry 4106 may be used to implement, in hardware circuitry, some embodiments described in the present disclosure. In some embodiments, the video processing circuitry 4106 may be at least partly included in the processor 4102, e.g., a graphics co-processor.

Figure 8:
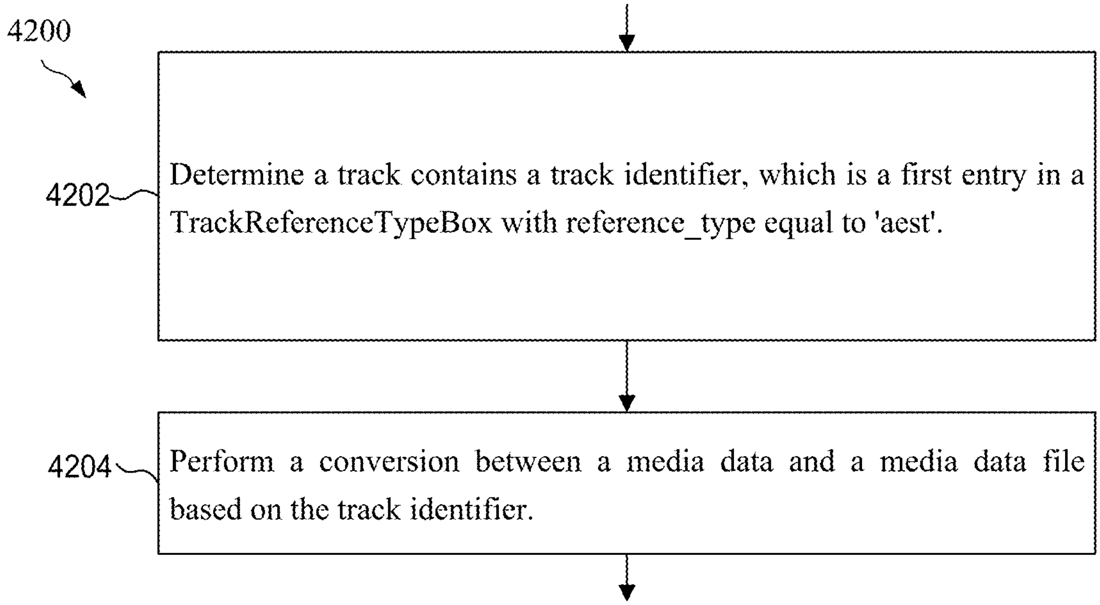
FIG. 8 is a flowchart for an example method of video processing.

FIG. 8 is a flowchart for an example method 4200 of video processing. The method 4200 determines a track contains a track identifier at step 4202. The track identifier is a first entry in a TrackReferenceTypeBox with reference_type equal to 'aest'. A conversion is performed between a media data and the media data file based on the track identifier at step 4204. Further, the conversion of step 4204 may include encoding into the media data file or decoding from the media data file.

It should be noted that the method 4200 can be implemented in an apparatus for processing video data comprising a processor and a non-transitory memory with instructions thereon, such as video encoder 4400, video decoder 4500, and/or encoder 4600. In such a case, the instructions upon execution by the processor, cause the processor to perform the method 4200. Further, the method 4200 can be performed by a non-transitory computer readable medium comprising a computer program product for use by a video coding device. The computer program product comprises computer executable instructions stored on the non-transitory computer readable medium such that when executed by a processor cause the video coding device to perform the method 4200.

Figure 9:
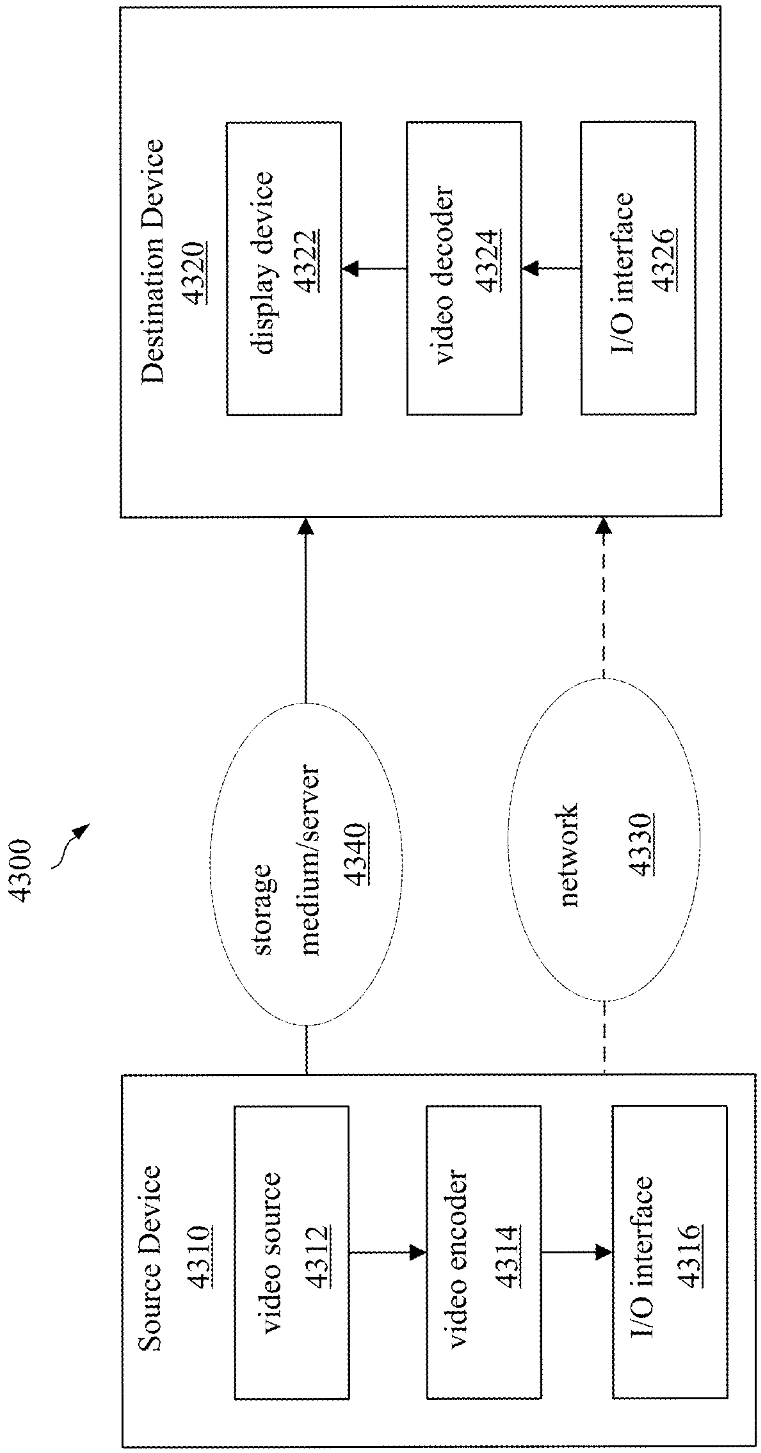
FIG. 9 is a block diagram that illustrates an example video coding system.

FIG. 9 is a block diagram that illustrates an example video coding system 4300 that may utilize the embodiments of this disclosure. The video coding system 4300 may include a source device 4310 and a destination device 4320. Source device 4310 generates encoded video data which may be referred to as a video encoding device. Destination device 4320 may decode the encoded video data generated by source device 4310 which may be referred to as a video decoding device.

Source device 4310 may include a video source 4312, a video encoder 4314, and an input/output (I/O) interface 4316. Video source 4312 may include a source such as a video capture device, an interface to receive video data from a video content provider, and/or a computer graphics system for generating video data, or a combination of such sources. The video data may comprise one or more pictures. Video encoder 4314 encodes the video data from video source 4312 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 4316 may include a modulator/demodulator (modem) and/or a transmitter. The encoded video data may be transmitted directly to destination device 4320 via I/O interface 4316 through network 4330. The encoded video data may also be stored onto a storage medium/server 4340 for access by destination device 4320.

Destination device 4320 may include an I/O interface 4326, a video decoder 4324, and a display device 4322. I/O interface 4326 may include a receiver and/or a modem. I/O interface 4326 may acquire encoded video data from the source device 4310 or the storage medium/server 4340. Video decoder 4324 may decode the encoded video data. Display device 4322 may display the decoded video data to a user. Display device 4322 may be integrated with the destination device 4320, or may be external to destination device 4320, which can be configured to interface with an external display device.

Video encoder 4314 and video decoder 4324 may operate according to a video compression standard, such as the High Efficiency Video Coding (HEVC) standard, Versatile Video Coding (VVC) standard and other current and/or further standards.

Figure 10:
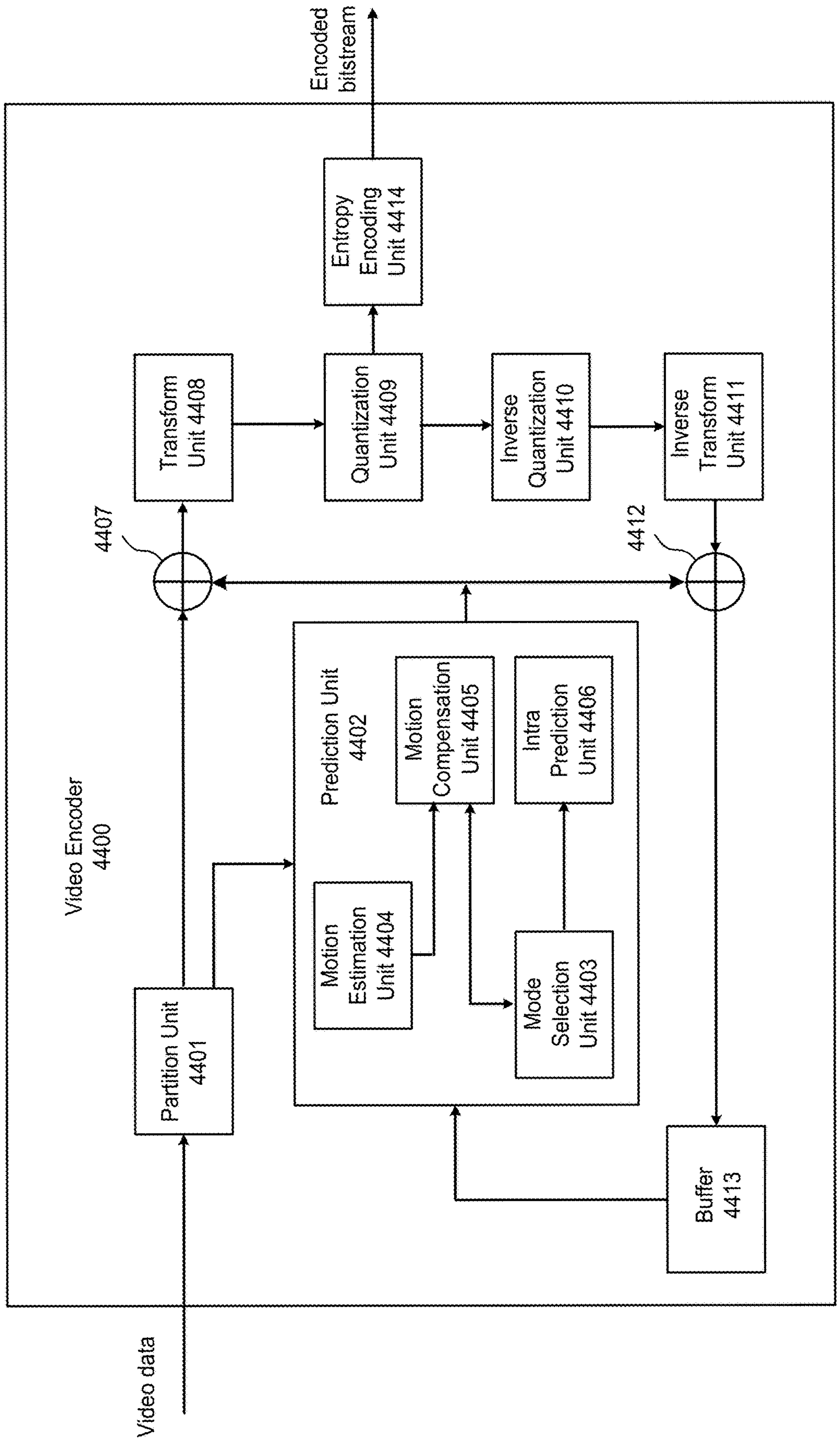
FIG. 10 is a block diagram that illustrates an example encoder.

FIG. 10 is a block diagram illustrating an example of video encoder 4400, which may be video encoder 4314 in the system 4300 illustrated in FIG. 9. Video encoder 4400 may be configured to perform any or all of the embodiments of this disclosure. The video encoder 4400 includes a plurality of functional components. The embodiments described in this disclosure may be shared among the various components of video encoder 4400. In some examples, a processor may be configured to perform any or all of the embodiments described in this disclosure.

The functional components of video encoder 4400 may include a partition unit 4401; a prediction unit 4402, which may include a mode select unit 4403, a motion estimation unit 4404, a motion compensation unit 4405, and an intra prediction unit 4406; a residual generation unit 4407; a transform processing unit 4408; a quantization unit 4409; an inverse quantization unit 4410; an inverse transform unit 4411; a reconstruction unit 4412; a buffer 4413; and an entropy encoding unit 4414.

In other examples, video encoder 4400 may include more, fewer, or different functional components. In an example, prediction unit 4402 may include an intra block copy (IBC) unit. The IBC unit may perform prediction in an IBC mode in which at least one reference picture is a picture where the current video block is located.

Furthermore, some components, such as motion estimation unit 4404 and motion compensation unit 4405 may be highly integrated, but are represented in the example of video encoder 4400 separately for purposes of explanation.

Partition unit 4401 may partition a picture into one or more video blocks. Video encoder 4400 and video decoder 4500 may support various video block sizes.

Mode select unit 4403 may select one of the coding modes, intra or inter, e.g., based on error results, and provide the resulting intra or inter coded block to a residual generation unit 4407 to generate residual block data and to a reconstruction unit 4412 to reconstruct the encoded block for use as a reference picture. In some examples, mode select unit 4403 may select a combination of intra and inter prediction (CIIP) mode in which the prediction is based on an inter prediction signal and an intra prediction signal. Mode select unit 4403 may also select a resolution for a motion vector (e.g., a sub-pixel or integer pixel precision) for the block in the case of inter prediction.

To perform inter prediction on a current video block, motion estimation unit 4404 may generate motion information for the current video block by comparing one or more reference frames from buffer 4413 to the current video block. Motion compensation unit 4405 may determine a predicted video block for the current video block based on the motion information and decoded samples of pictures from buffer 4413 other than the picture associated with the current video block.

Motion estimation unit 4404 and motion compensation unit 4405 may perform different operations for a current video block, for example, depending on whether the current video block is in an I slice, a P slice, or a B slice.

In some examples, motion estimation unit 4404 may perform uni-directional prediction for the current video block, and motion estimation unit 4404 may search reference pictures of list 0 or list 1 for a reference video block for the current video block. Motion estimation unit 4404 may then generate a reference index that indicates the reference picture in list 0 or list 1 that contains the reference video block and a motion vector that indicates a spatial displacement between the current video block and the reference video block. Motion estimation unit 4404 may output the reference index, a prediction direction indicator, and the motion vector as the motion information of the current video block. Motion compensation unit 4405 may generate the predicted video block of the current block based on the reference video block indicated by the motion information of the current video block.

In other examples, motion estimation unit 4404 may perform bi-directional prediction for the current video block, motion estimation unit 4404 may search the reference pictures in list 0 for a reference video block for the current video block and may also search the reference pictures in list 1 for another reference video block for the current video block. Motion estimation unit 4404 may then generate reference indexes that indicate the reference pictures in list 0 and list 1 containing the reference video blocks and motion vectors that indicate spatial displacements between the reference video blocks and the current video block. Motion estimation unit 4404 may output the reference indexes and the motion vectors of the current video block as the motion information of the current video block. Motion compensation unit 4405 may generate the predicted video block of the current video block based on the reference video blocks indicated by the motion information of the current video block.

In some examples, motion estimation unit 4404 may output a full set of motion information for decoding processing of a decoder. In some examples, motion estimation unit 4404 may not output a full set of motion information for the current video. Rather, motion estimation unit 4404 may signal the motion information of the current video block with reference to the motion information of another video block. For example, motion estimation unit 4404 may determine that the motion information of the current video block is sufficiently similar to the motion information of a neighboring video block.

In one example, motion estimation unit 4404 may indicate, in a syntax structure associated with the current video block, a value that indicates to the video decoder 4500 that the current video block has the same motion information as another video block.

In another example, motion estimation unit 4404 may identify, in a syntax structure associated with the current video block, another video block and a motion vector difference (MVD). The motion vector difference indicates a difference between the motion vector of the current video block and the motion vector of the indicated video block. The video decoder 4500 may use the motion vector of the indicated video block and the motion vector difference to determine the motion vector of the current video block.

As discussed above, video encoder 4400 may predictively signal the motion vector. Two examples of predictive signaling techniques that may be implemented by video encoder 4400 include advanced motion vector prediction (AMVP) and merge mode signaling.

Intra prediction unit 4406 may perform intra prediction on the current video block. When intra prediction unit 4406 performs intra prediction on the current video block, intra prediction unit 4406 may generate prediction data for the current video block based on decoded samples of other video blocks in the same picture. The prediction data for the current video block may include a predicted video block and various syntax elements.

Residual generation unit 4407 may generate residual data for the current video block by subtracting the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 4407 may not perform the subtracting operation.

Transform processing unit 4408 may generate one or more transform coefficient video blocks for the current video block by applying one or more transforms to a residual video block associated with the current video block.

After transform processing unit 4408 generates a transform coefficient video block associated with the current video block, quantization unit 4409 may quantize the transform coefficient video block associated with the current video block based on one or more quantization parameter (QP) values associated with the current video block.

Inverse quantization unit 4410 and inverse transform unit 4411 may apply inverse quantization and inverse transforms to the transform coefficient video block, respectively, to reconstruct a residual video block from the transform coefficient video block. Reconstruction unit 4412 may add the reconstructed residual video block to corresponding samples from one or more predicted video blocks generated by the prediction unit 4402 to produce a reconstructed video block associated with the current block for storage in the buffer 4413.

After reconstruction unit 4412 reconstructs the video block, the loop filtering operation may be performed to reduce video blocking artifacts in the video block.

Entropy encoding unit 4414 may receive data from other functional components of the video encoder 4400. When entropy encoding unit 4414 receives the data, entropy encoding unit 4414 may perform one or more entropy encoding operations to generate entropy encoded data and output a bitstream that includes the entropy encoded data.

Figure 11:
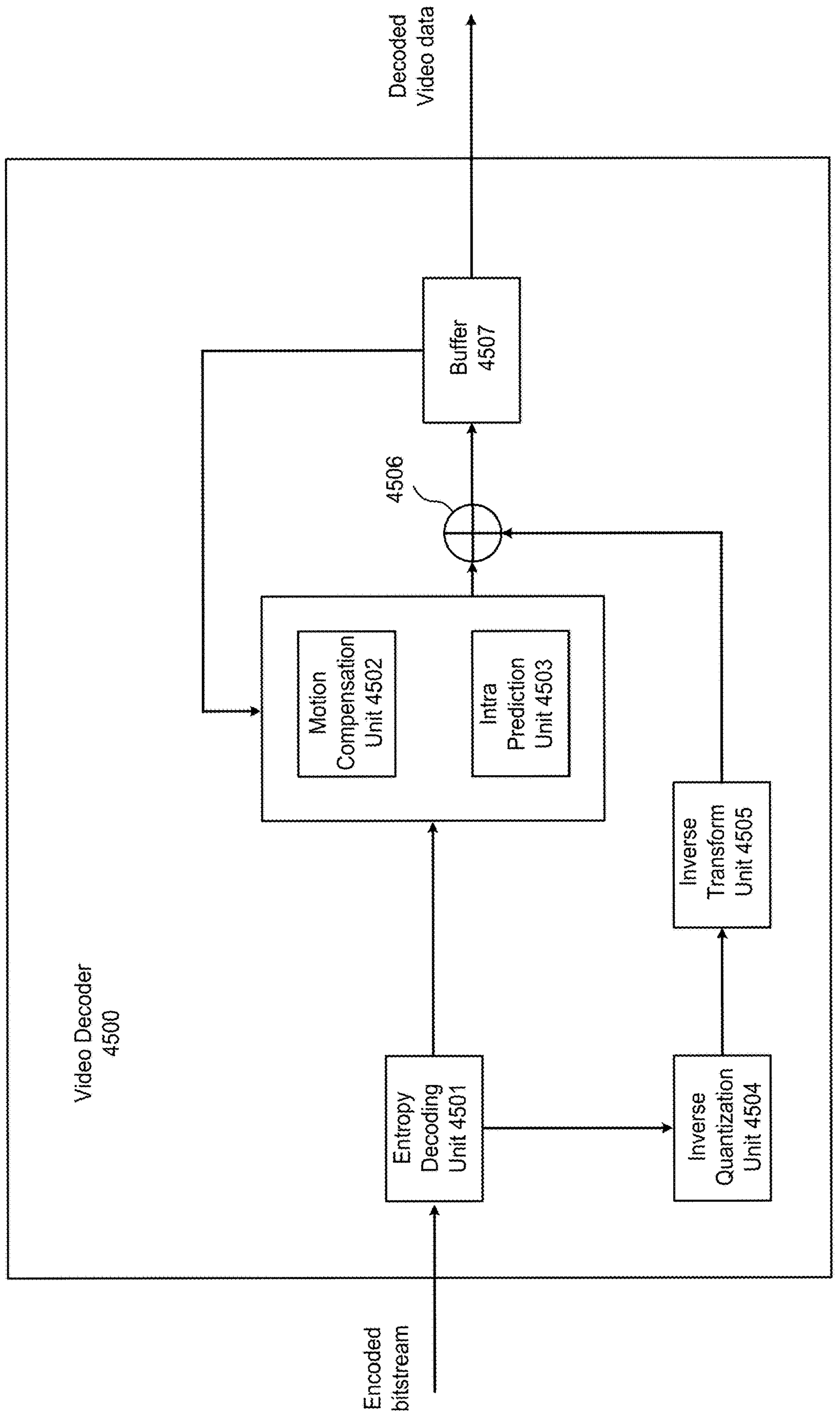
FIG. 11 is a block diagram that illustrates an example decoder.

FIG. 11 is a block diagram illustrating an example of video decoder 4500 which may be video decoder 4324 in the system 4300 illustrated in FIG. 9. The video decoder 4500 may be configured to perform any or all of the embodiments of this disclosure. In the example shown, the video decoder 4500 includes a plurality of functional components. The embodiments described in this disclosure may be shared among the various components of the video decoder 4500. In some examples, a processor may be configured to perform any or all of the embodiments described in this disclosure.

In the example shown, video decoder 4500 includes an entropy decoding unit 4501, a motion compensation unit 4502, an intra prediction unit 4503, an inverse quantization unit 4504, an inverse transformation unit 4505, a reconstruction unit 4506, and a buffer 4507. Video decoder 4500 may, in some examples, perform a decoding pass generally reciprocal to the encoding pass described with respect to video encoder 4400.

Entropy decoding unit 4501 may retrieve an encoded bitstream. The encoded bitstream may include entropy coded video data (e.g., encoded blocks of video data). Entropy decoding unit 4501 may decode the entropy coded video data, and from the entropy decoded video data, motion compensation unit 4502 may determine motion information including motion vectors, motion vector precision, reference picture list indexes, and other motion information. Motion compensation unit 4502 may, for example, determine such information by performing the AMVP and merge mode.

Motion compensation unit 4502 may produce motion compensated blocks, possibly performing interpolation based on interpolation filters. Identifiers for interpolation filters to be used with sub-pixel precision may be included in the syntax elements.

Motion compensation unit 4502 may use interpolation filters as used by video encoder 4400 during encoding of the video block to calculate interpolated values for sub-integer pixels of a reference block. Motion compensation unit 4502 may determine the interpolation filters used by video encoder 4400 according to received syntax information and use the interpolation filters to produce predictive blocks.

Motion compensation unit 4502 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter coded block, and other information to decode the encoded video sequence.

Intra prediction unit 4503 may use intra prediction modes for example received in the bitstream to form a prediction block from spatially adjacent blocks. Inverse quantization unit 4504 inverse quantizes, i.e., de-quantizes, the quantized video block coefficients provided in the bitstream and decoded by entropy decoding unit 4501. Inverse transform unit 4505 applies an inverse transform.

Reconstruction unit 4506 may sum the residual blocks with the corresponding prediction blocks generated by motion compensation unit 4502 or intra prediction unit 4503 to form decoded blocks. If desired, a deblocking filter may also be applied to filter the decoded blocks in order to remove blockiness artifacts. The decoded video blocks are then stored in buffer 4507, which provides reference blocks for subsequent motion compensation/intra prediction and also produces decoded video for presentation on a display device.

Figure 12:
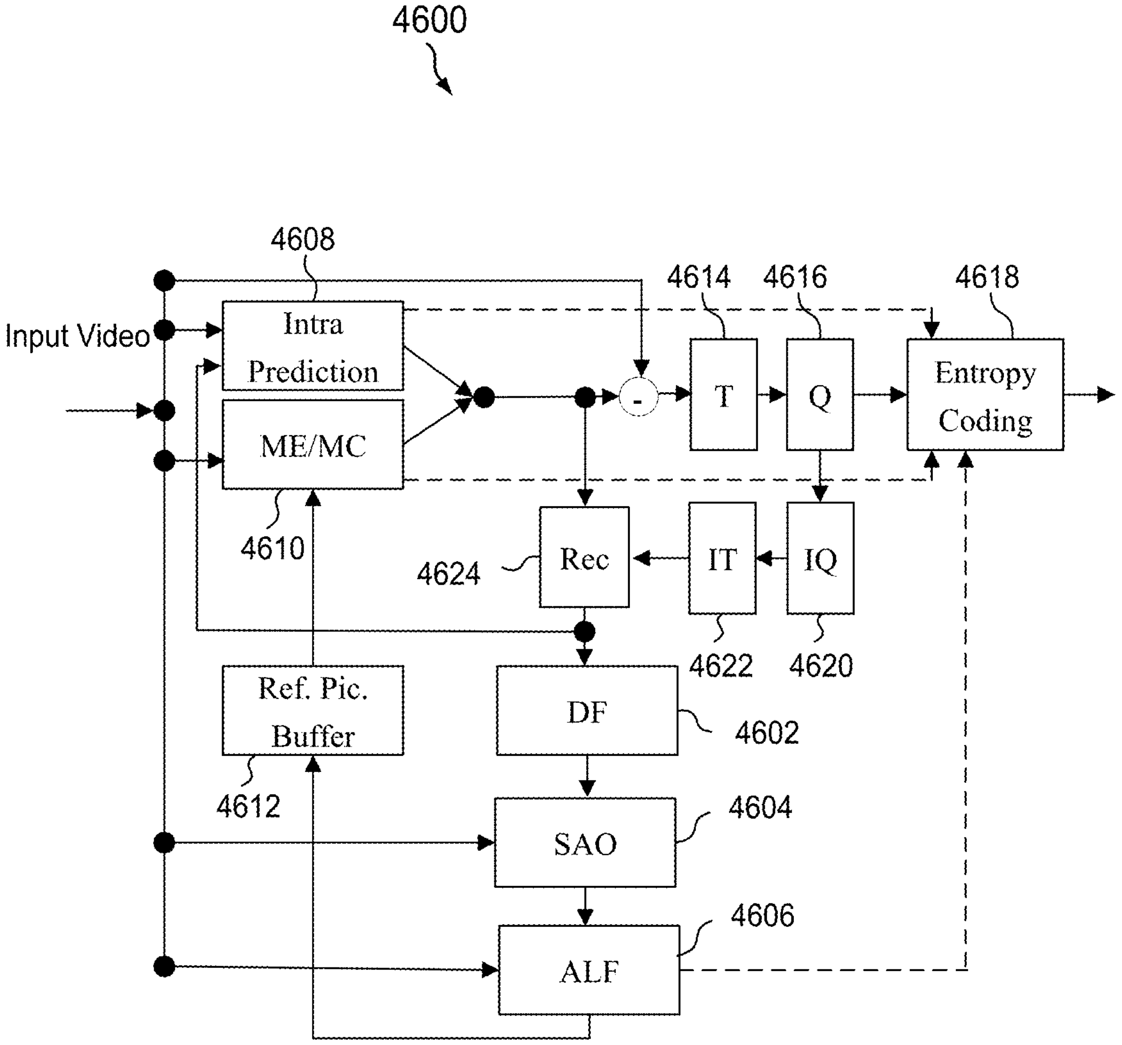
FIG. 12 is a schematic diagram of an example encoder.

FIG. 12 is a schematic diagram of an example encoder 4600. The encoder 4600 is suitable for implementing the techniques of VVC. The encoder 4600 includes three in-loop filters, namely a deblocking filter (DF) 4602, a sample adaptive offset (SAO) 4604, and an adaptive loop filter (ALF) 4606. Unlike the DF 4602, which uses predefined filters, the SAO 4604 and the ALF 4606 utilize the original samples of the current picture to reduce the mean square errors between the original samples and the reconstructed samples by adding an offset and by applying a finite impulse response (FIR) filter, respectively, with coded side information signaling the offsets and filter coefficients. The ALF 4606 is located at the last processing stage of each picture and can be regarded as a tool trying to catch and fix artifacts created by the previous stages.

The encoder 4600 further includes an intra prediction component 4608 and a motion estimation/compensation (ME/MC) component 4610 configured to receive input video. The intra prediction component 4608 is configured to perform intra prediction, while the ME/MC component 4610 is configured to utilize reference pictures obtained from a reference picture buffer 4612 to perform inter prediction. Residual blocks from inter prediction or intra prediction are fed into a transform (T) component 4614 and a quantization (Q) component 4616 to generate quantized residual transform coefficients, which are fed into an entropy coding component 4618. The entropy coding component 4618 entropy codes the prediction results and the quantized transform coefficients and transmits the same toward a video decoder (not shown). Quantization components output from the quantization component 4616 may be fed into an inverse quantization (IQ) components 4620, an inverse transform component 4622, and a reconstruction (REC) component 4624. The REC component 4624 is able to output images to the DF 4602, the SAO 4604, and the ALF 4606 for filtering prior to those images being stored in the reference picture buffer 4612.

A listing of solutions preferred by some examples is provided next.

The following solutions show examples of embodiments discussed herein.

The following solutions show examples of embodiments discussed in the previous section.

1. A method for processing media data comprising: determining a track contains a track identifier, which is a first entry in a TrackReferenceTypeBox with reference_type equal to 'aest'; and performing a conversion between a media data and a media data file based on the track identifier.
2. The method of solution 1, wherein the TrackReferenceTypeBox with reference_type equal to 'aest' shall contain only the track identifier and shall not contain any track group identifier.
3. The method of any of solutions 1-2, wherein the TrackReferenceTypeBox with reference_type equal to 'aest' shall contain, in a first entry, a track identifier and other entries that contain track group identifiers.
4. The method of any of solutions 1-3, wherein a first entry in the TrackReferenceTypeBox with reference_type equal to 'aest' shall be the track identifier.
5. The method of any of solutions 1-4, wherein the media data file specifies whether a closest preceding stream access point (SAP) sample of type 1, 2, or 3 is needed for random accessing from an extended dependent random access point (EDRAP) sample.
6. The method of any of solutions 1-5, wherein an EDRAP sample is a sample for which all subsequent samples in both decoding and output order can be correctly decoded provided that required preceding SAP or EDRAP samples are available for decoding the sample and subsequent samples, and wherein the required preceding SAP or EDRAP samples include one or more of a set of samples starting from a closest preceding SAP sample of type 1, 2, or 3 in decoding order (closestSapSample), and include all EDRAP samples between closestSapSample and the sample in decoding order.
7. The method of any of solutions 1-6, wherein an EDRAP sample is a sample for which all subsequent samples in both decoding and output order can be correctly decoded provided that required preceding SAP or EDRAP samples are available for decoding the sample and subsequent samples, wherein the required preceding SAP or EDRAP samples include zero or more of a set of samples starting from a closest preceding SAP sample of type 1, 2, or 3 in decoding order (closestSapSample), and include all EDRAP samples between closestSapSample and the sample in decoding order.
8. The method of any of solutions 1-7, wherein when a media track has a track reference of type 'aest', for each EDRAP sample sampleA in the media track, there shall be one and only one sample sampleB in a referenced track that has a same decoding time as sampleA, and wherein sampleB shall contain all media data of required preceding SAP or EDRAP samples of sampleA.
9. The method of any of solutions 1-8, wherein for any EDRAP sample sampleA that is mapped to an EDRAP sample group, sampleSeq is a sequence of samples comprising samples including SAP or EDRAP samples identified by ref_sap_or_edrap_idx_delta[i] for i in a range of 0 to num_ref_sap_or_edrap_samples_minus1, inclusive, in decoding order, sampleA, and all samples following sampleA in both decoding and output order in the track, and for each sample sampleB in sampleSeq, all data needed for processing sampleB shall be accessible in a referenced sample entry, in sampleB, or in any sample that precedes sampleB in decoding order and is present in sampleSeq.
10. The method of any of solutions 1-9, wherein VisualEdrapEntry( ) is specified as follows:

```
class VisualEdrapEntry( ) extends VisualSampleGroupEntry('edrp') {
  unsigned int(3) edrap_type;
  unsigned int(3) num_ref_sap_or_edrap_samples_minus1;
  unsigned int(2) reserved = 0;
  for(i=0; i<=num_ref_sap_or_edrap_samples_minus1; i++)
    unsigned int(16) ref_sap_or_edrap_idx_delta[i];
}.
```

11. The method of any of solutions 1-10, wherein num_ref_sap_or_edrap_samples_minus1 plus 1 indicates a number of samples in required preceding SAP or EDRAP samples, which are earlier in decoding order than the EDRAP sample and are needed for reference to be able to correctly decode the EDRAP sample and all samples following the EDRAP sample in both decoding and output order when starting decoding from the EDRAP sample.
12. The method of any of solutions 1-11, wherein ref_sap_or_edrap_idx_delta[i] indicates an i-th required preceding SAP or EDRAP sample of a current EDRAP sample, wherein a list of SAP or EDRAP samples associated with a SAP sample of type 1, 2 or 3 include a SAP sample and all EDRAP samples following the SAP sample and preceding a next SAP sample, wherein a SAP_or_EDRAP sample index is an index to the list of SAP or EDRAP samples, wherein a value of ref_sap_or_edrap_idx_delta[i] is equal to a difference between a SAP_or_EDRAP sample index of the current EDRAP sample and a SAP_or_EDRAP sample index of an i-th required preceding SAP or EDRAP sample, wherein a value of 1 indicates that an i-th required SAP or EDRAP sample is a last SAP or EDRAP sample preceding the EDRAP sample in decoding order, and wherein a value 2 indicates that the i-th required SAP or EDRAP sample is a second last EDRAP sample preceding the EDRAP sample in decoding order.
13. An apparatus for processing video data comprising: a processor; and a non-transitory memory with instructions thereon, wherein the instructions upon execution by the processor, cause the processor to perform the method of any of solutions 1-12.
14. A non-transitory computer readable medium comprising a computer program product for use by a video coding device, the computer program product comprising computer executable instructions stored on the non-transitory computer readable medium such that when executed by a processor cause the video coding device to perform the method of any of solutions 1-12.

15. A non-transitory computer-readable recording medium storing a bitstream of a video which is generated by a method performed by a video processing apparatus, wherein the method comprises: determining a track contains a track identifier, which is a first entry in a TrackReferenceTypeBox with reference_type equal to 'aest'; and generating a bitstream based on the determining.

16. A method for storing bitstream of a video comprising: determining a track contains a track identifier, which is a first entry in a TrackReference TypeBox with reference_type equal to 'aest'; generating a bitstream based on the determining; and storing the bitstream in a non-transitory computer-readable recording medium.

17. A method, apparatus or system described in the present disclosure.

In the solutions described herein, an encoder may conform to the format rule by producing a coded representation according to the format rule. In the solutions described herein, a decoder may use the format rule to parse syntax elements in the coded representation with the knowledge of presence and absence of syntax elements according to the format rule to produce decoded video.

In the present disclosure, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this disclosure can be implemented in digital electronic circuitry, or in computer software, firmware, or hardware, including the structures disclosed in this disclosure and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., a field-programmable gate array (FPGA) or an application-specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc read-only memory (CD ROM) and Digital versatile disc-read only memory (DVD-ROM) disks. The processor and the memory can be supplemented by, or incorporated in, special purpose logic circuitry.

While the present disclosure contains many specifics, these should not be construed as limitations on the scope of any subject matter or of what may be claimed, but rather as descriptions of features that may be specific to particular embodiments of the present disclosure. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including+10% of the subsequent number unless otherwise stated.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled may be directly connected or may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for processing media data, comprising:

determining, during a conversion between the media data and a media data file, whether a track reference of type associated external stream track ('aest') is included in a media track; and performing the conversion based on the determining, wherein when present, a track reference type box with a reference type equal to 'aest' shall contain only a track identifier and shall not contain any track group identifier.

2. The method of claim 1, wherein when the media track has the track reference of type 'aest', for each extended dependent random access point (EDRAP) sample sampleA in the media track, there shall be one and only one sample sampleB in a referenced track that has a same decoding time as sampleA, and sampleB shall contain all media data of required preceding stream access point (SAP) or EDRAP samples of sampleA.

3. The method of claim 1, further comprising:

determining an extended dependent random access point (EDRAP) sample of the media data, wherein the EDRAP sample is a sample for which all subsequent samples in both decoding and output order can be correctly decoded provided that required preceding stream access point (SAP) or EDRAP samples are available for decoding the sample and subsequent samples, and wherein the required preceding SAP or EDRAP samples include one or more of a set of samples starting from a closest preceding SAP sample of type 1, 2, or 3 in decoding order (closestSapSample), and including all EDRAP samples between closestSapSample and the sample in decoding order.

4. The method of claim 3, wherein for any EDRAP sample sampleA that is mapped to an EDRAP sample group, a sample sequence is a sequence of samples comprising samples in an order of bullets below:

i) SAP or EDRAP samples identified by a first syntax element with an index in a range of 0 to a value of a second syntax element, inclusive, in decoding order;

ii) sampleA; and iii) all samples following sampleA in both decoding and output order in a track.

5. The method of claim 4, wherein for each sample sampleB in the sample sequence, all data needed for processing sampleB shall be accessible in a referenced sample entry, in sampleB itself, or in any sample that precedes sampleB in decoding order and is present in the sample sequence.

6. The method of claim 4, wherein the second syntax element plus one indicates a number of samples in the required preceding SAP or EDRAP samples, which are earlier in decoding order than the EDRAP sample and are needed for reference to be able to correctly decode the EDRAP sample and all samples following the EDRAP sample in both decoding and output order when starting decoding from the EDRAP sample.

7. The method of claim 4, wherein the first syntax element with the index of i indicates an i-th required preceding SAP or EDRAP sample of a current EDRAP sample, wherein a list of SAP or EDRAP samples associated with an SAP sample of type 1, 2 or 3 includes the SAP sample and all EDRAP samples following the SAP sample and preceding a next SAP sample, when present, and wherein an SAP_or_EDRAP sample index is an index to the list of SAP or EDRAP samples.

8. The method of claim 7, wherein a value of the first syntax element is equal to a difference between an SAP_or_EDRAP sample index of the current EDRAP sample and an SAP_or_EDRAP sample index of an i-th required preceding SAP or EDRAP sample, wherein the value of the first syntax element equal to 1 indicates that the i-th required SAP or EDRAP sample is a last SAP or EDRAP sample preceding the EDRAP sample in decoding order, and wherein the value of the first syntax element equal to 2 indicates that the i-th required SAP or EDRAP sample is a second last EDRAP sample preceding the EDRAP sample in decoding order.

9. The method of claim 4, wherein the first syntax element is ref_sap_or_edrap_idx_delta, and the second syntax element is num_ref_sap_or_edrap_samples_minus1.

10. The method of claim 4, wherein when present, the first syntax element and the second syntax element are included in a syntax structure of visual EDRAP entry.

11. The method of claim 4, wherein the first syntax element is coded with an unsigned integer using 16 bits, and the second syntax element is coded with an unsigned integer using 3 bits.

12. The method of claim 1, wherein when the media track has the track reference of type 'aest', for each extended dependent random access point (EDRAP) sample sampleA in the media track, there shall be one and only one sample sampleB in a referenced track that has a same decoding time as sampleA, and sampleB shall contain all media data of a closest stream access point (SAP) sample of type 1, 2, or 3 that precedes sampleA in decoding order and required SAP or EDRAP samples of sampleA.

13. The method of claim 1, wherein the conversion includes generating the media data file from the media data.

14. The method of claim 1, wherein the conversion includes parsing the media data from the media data file.

15. An apparatus for processing media data comprising: a processor; and a non-transitory memory with instructions thereon, wherein the instructions upon execution by the processor, cause the processor to:

determine, during a conversion between the media data and a media data file, whether a track reference of type associated external stream track ('aest') is included in a media track; and perform the conversion based on the determining, wherein when present, a track reference type box with a reference type equal to 'aest' shall contain only a track identifier and shall not contain any track group identifier.

16. The apparatus of claim 15, wherein when the media track has the track reference of type 'aest', for each extended dependent random access point (EDRAP) sample sampleA in the media track, there shall be one and only one sample sampleB in a referenced track that has a same decoding time as sampleA, and sampleB shall contain all media data of required preceding stream access point (SAP) or EDRAP samples of sampleA.

17. A non-transitory computer readable storage medium storing instructions that cause a processor to:

determine, during a conversion between media data and a media data file, whether a track reference of type associated external stream track ('aest') is included in a media track; and perform the conversion based on the determining, wherein when present, a track reference type box with a reference type equal to 'aest' shall contain only a track identifier and shall not contain any track group identifier.

18. The non-transitory computer readable storage medium of claim 17, wherein when the media track has the track reference of type 'aest', for each extended dependent random access point (EDRAP) sample sampleA in the media track, there shall be one and only one sample sampleB in a referenced track that has a same decoding time as sampleA, and sampleB shall contain all media data of required preceding stream access point (SAP) or EDRAP samples of sampleA.

19. A non-transitory computer-readable recording medium storing a media data file which is generated by a method performed by a video processing apparatus, wherein the method comprises:

determining whether a track reference of type associated external stream track ('aest') is included in a media track; and generating the media data file based on the determining, wherein when present, a track reference type box with a reference type equal to 'aest' shall contain only a track identifier and shall not contain any track group identifier.

20. The non-transitory computer-readable recording medium of claim 19, wherein when the media track has the track reference of type 'aest', for each extended dependent random access point (EDRAP) sample sampleA in the media track, there shall be one and only one sample sampleB in a referenced track that has a same decoding time as sampleA, and sampleB shall contain all media data of required preceding stream access point (SAP) or EDRAP samples of sampleA.

* * * * *